US012634896B2

(12) United States Patent
Abotabl et al.

(10) Patent No.: US 12,634,896 B2
(45) Date of Patent: May 19, 2026

(54) FREQUENCY HOPPING IN FULL-DUPLEX COMMUNICATIONS

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 17/871,369

(22) Filed: Jul. 22, 2022

(65) Prior Publication Data

US 2024/0032001 A1     Jan. 25, 2024

(51) Int. Cl.
*H04W 72/044* (2023.01)
*H04L 5/00* (2006.01)
*H04L 5/14* (2006.01)

(52) U.S. Cl.
CPC ......... *H04W 72/044* (2013.01); *H04L 5/0012* (2013.01); *H04L 5/14* (2013.01)

(58) Field of Classification Search
CPC ....... H04W 72/044; H04L 5/0012; H04L 5/14
See application file for complete search history.

(56) References Cited

U.S. PATENT DOCUMENTS

| | | | |
|---|---|---|---|
| 2017/0214492 A1* | 7/2017 | Liu | H04L 1/08 |
| 2021/0152418 A1 | 5/2021 | Abdelghaffar et al. | |
| 2021/0320779 A1 | 10/2021 | Huang et al. | |
| 2023/0292294 A1* | 9/2023 | Rudolf | H04L 5/0094 |
| 2024/0204934 A1* | 6/2024 | Sun | H04L 5/0051 |
| 2024/0259146 A1* | 8/2024 | Wu | H04B 1/715 |

OTHER PUBLICATIONS

International Search Report and Written Opinion—PCT/US2023/025737—ISA/EPO—Oct. 6, 2023 (2205038WO).

* cited by examiner

*Primary Examiner* — Michael Thier
*Assistant Examiner* — Tracy Lauren Raimondo
(74) *Attorney, Agent, or Firm* — Holland & Hart LLP

(57) ABSTRACT

Methods, systems, and devices for wireless communications are described. Some wireless communications may support frequency hopping in full-duplex communications. For example, a user equipment (UE) may receive an indication of one or more resource block (RB) sets over which the UE is to perform one or more uplink transmissions during a slot, where each RB set of the one or more RB sets is associated with a set of one or more frequency hopping parameters. The UE may select, for a first RB set of the one or more RB sets, a frequency hopping enablement status or a frequency hopping pattern based on a full-duplex classification of the slot and the set of one or more frequency hopping parameters for the first RB set. Additionally, the UE may perform the one or more uplink transmissions in accordance with the selected frequency hopping enablement status or the selected frequency hopping pattern.

30 Claims, 17 Drawing Sheets

RB Set Indication 205

Uplink Transmission 210

105-a 115-a

Uplink Sub-band 220-a

Downlink Sub-band 225

Uplink Sub-band 220-b

Slot 215

200

1010        1020        1015

1005

1000

Resource Block Set Indication Component

1225

Frequency Hopping Status Component

1235

Frequency Hopping Pattern Component

1230

1220

1200

130    105    115

Network
Entity

Transceiver    Antenna 1310    1315

Communications
Manager

Memory

Code

1330

1320    1325

1340

Processor

1335

1305

1300

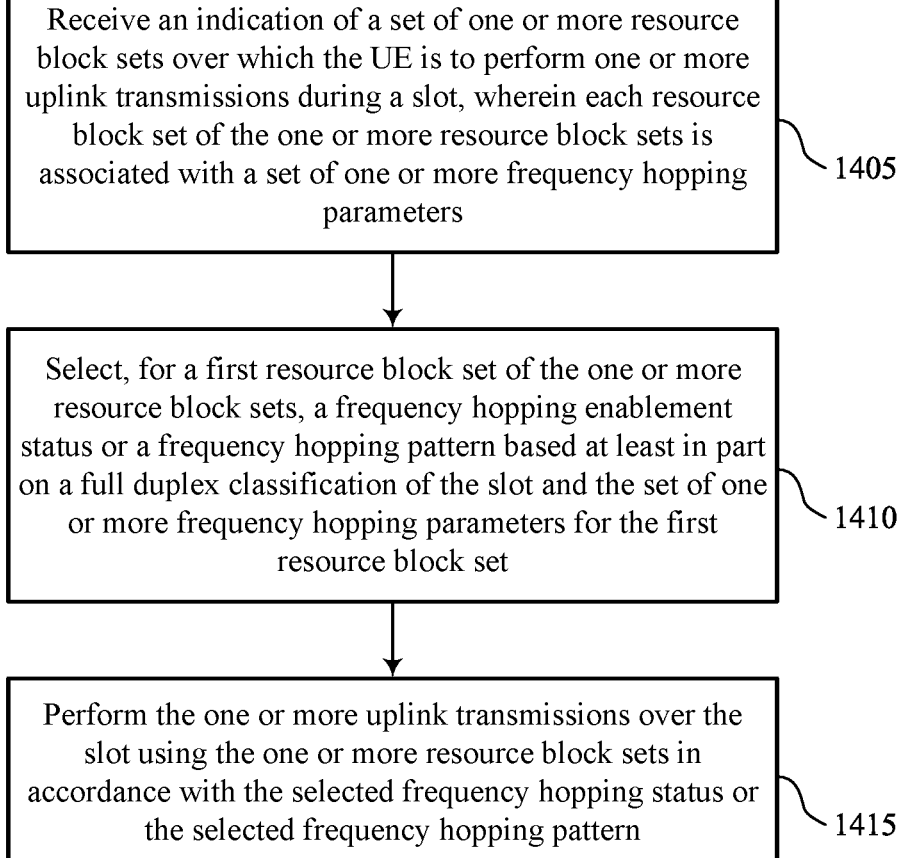

Receive an indication of a set of one or more resource block sets over which the UE is to perform one or more uplink transmissions during a slot, wherein each resource block set of the one or more resource block sets is associated with a set of one or more frequency hopping parameters ⟩ 1405

Select, for a first resource block set of the one or more resource block sets, a frequency hopping enablement status or a frequency hopping pattern based at least in part on a full duplex classification of the slot and the set of one or more frequency hopping parameters for the first resource block set ⟩ 1410

Perform the one or more uplink transmissions over the slot using the one or more resource block sets in accordance with the selected frequency hopping status or the selected frequency hopping pattern ⟩ 1415

Figure 15:
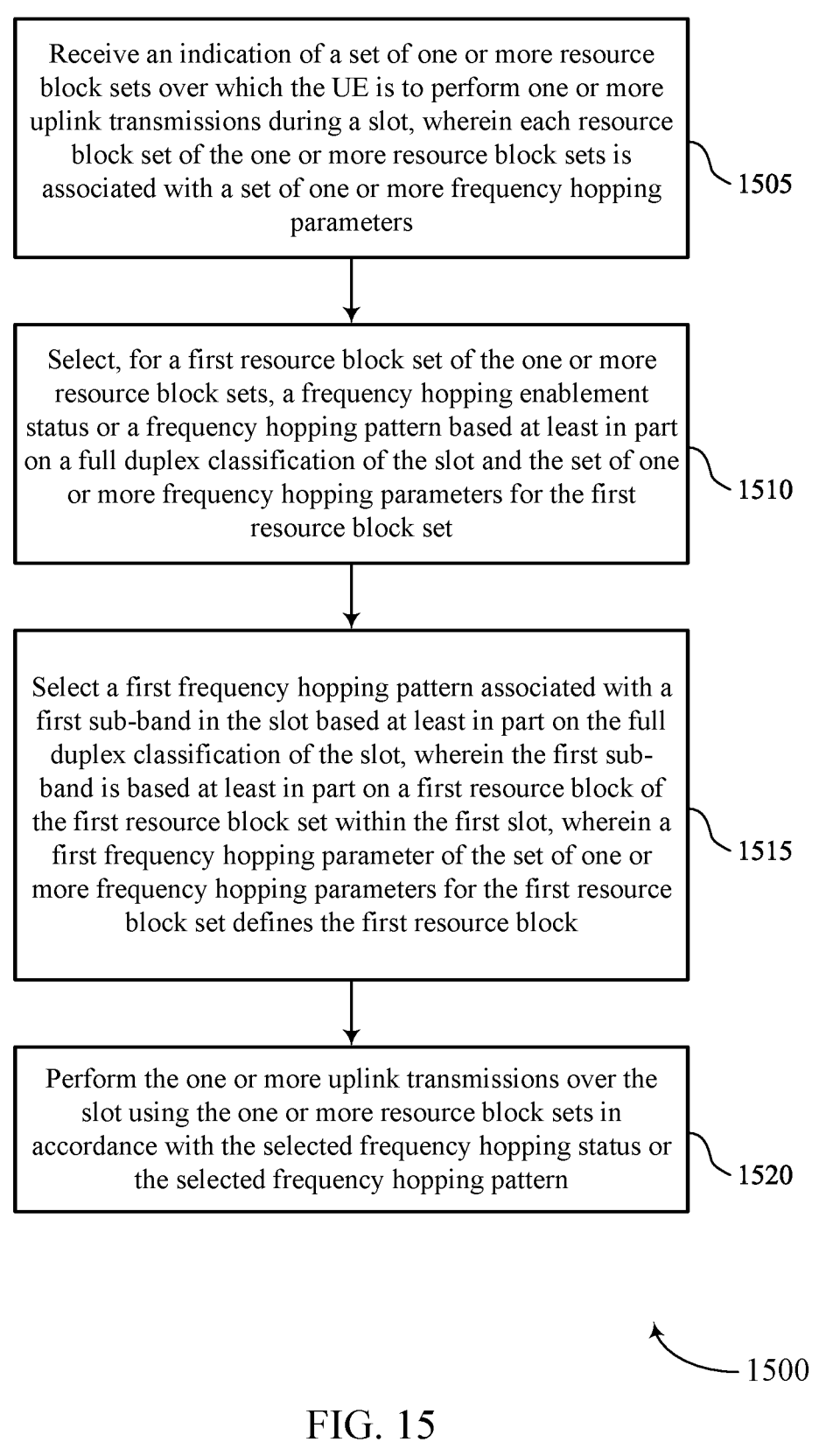

Receive an indication of a set of one or more resource block sets over which the UE is to perform one or more uplink transmissions during a slot, wherein each resource block set of the one or more resource block sets is associated with a set of one or more frequency hopping parameters — 1505

Select, for a first resource block set of the one or more resource block sets, a frequency hopping enablement status or a frequency hopping pattern based at least in part on a full duplex classification of the slot and the set of one or more frequency hopping parameters for the first resource block set — 1510

Select a first frequency hopping pattern associated with a first sub-band in the slot based at least in part on the full duplex classification of the slot, wherein the first sub-band is based at least in part on a first resource block of the first resource block set within the first slot, wherein a first frequency hopping parameter of the set of one or more frequency hopping parameters for the first resource block set defines the first resource block — 1515

Perform the one or more uplink transmissions over the slot using the one or more resource block sets in accordance with the selected frequency hopping status or the selected frequency hopping pattern — 1520

Figure 16:
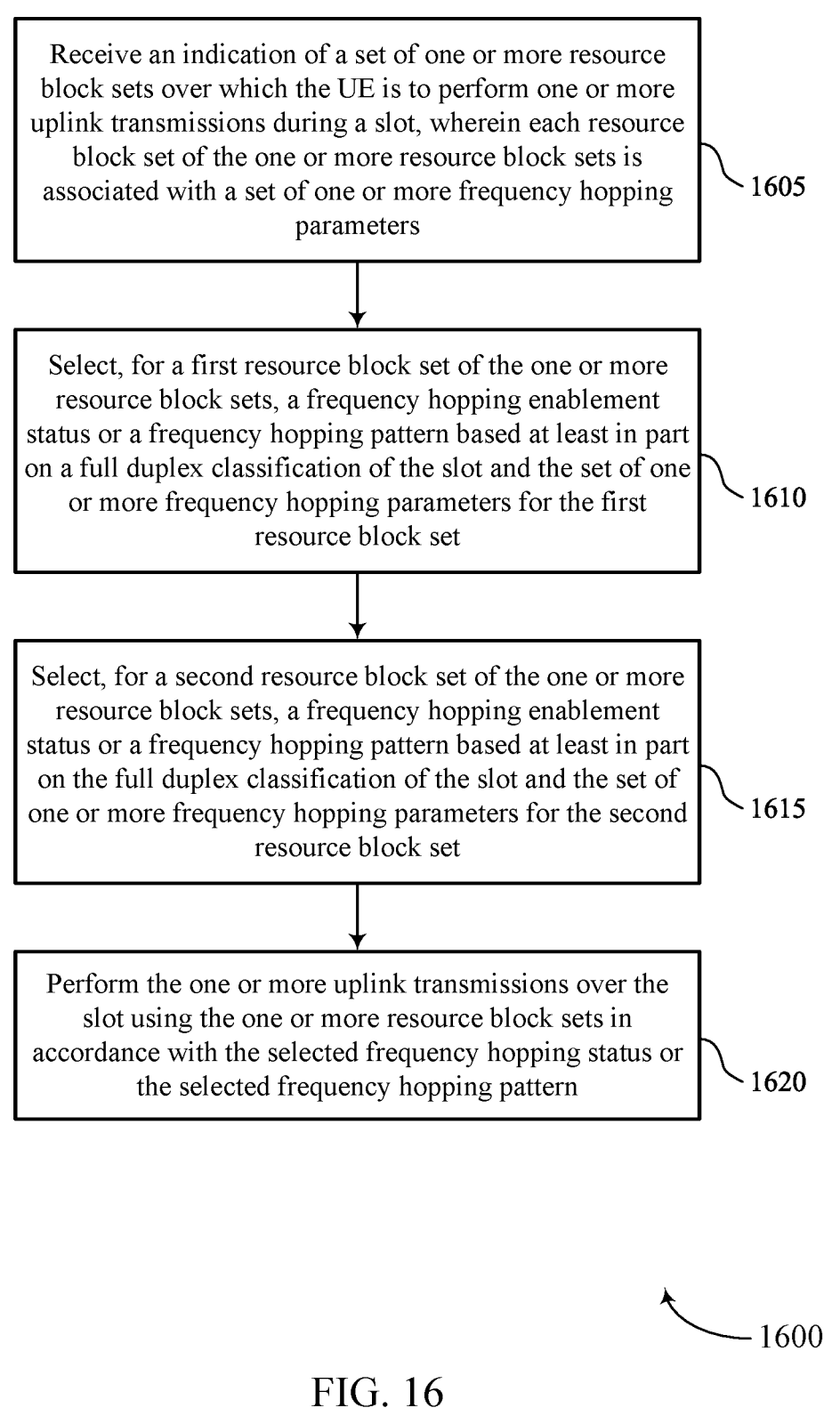

Receive an indication of a set of one or more resource
block sets over which the UE is to perform one or more
uplink transmissions during a slot, wherein each resource
block set of the one or more resource block sets is
associated with a set of one or more frequency hopping
parameters
⤸ 1605

↓

Select, for a first resource block set of the one or more
resource block sets, a frequency hopping enablement
status or a frequency hopping pattern based at least in part
on a full duplex classification of the slot and the set of one
or more frequency hopping parameters for the first
resource block set
⤸ 1610

↓

Select, for a second resource block set of the one or more
resource block sets, a frequency hopping enablement
status or a frequency hopping pattern based at least in part
on the full duplex classification of the slot and the set of
one or more frequency hopping parameters for the second
resource block set
⤸ 1615

↓

Perform the one or more uplink transmissions over the
slot using the one or more resource block sets in
accordance with the selected frequency hopping status or
the selected frequency hopping pattern
⤸ 1620

Figure 17:
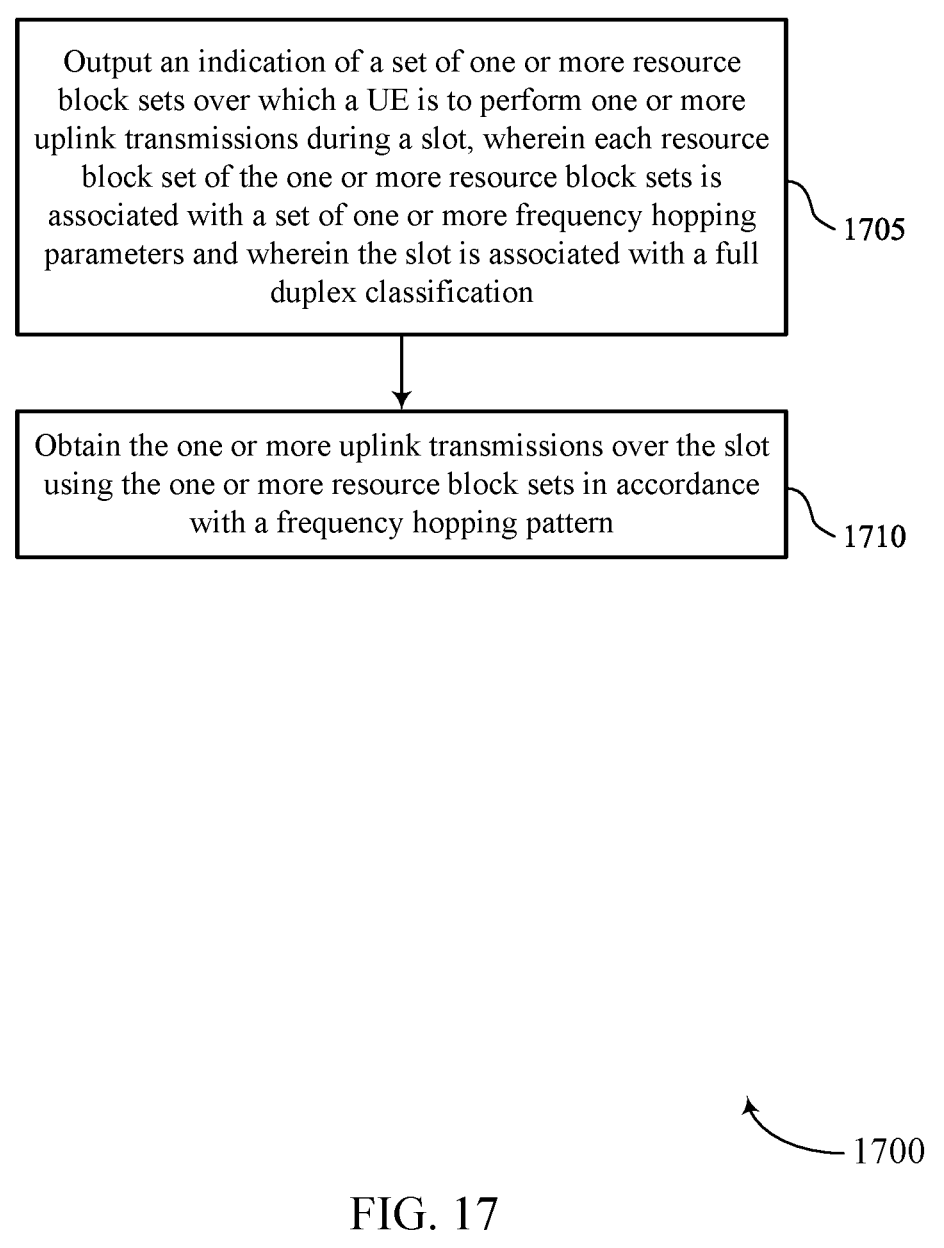

Output an indication of a set of one or more resource block sets over which a UE is to perform one or more uplink transmissions during a slot, wherein each resource block set of the one or more resource block sets is associated with a set of one or more frequency hopping parameters and wherein the slot is associated with a full duplex classification 1705

Obtain the one or more uplink transmissions over the slot using the one or more resource block sets in accordance with a frequency hopping pattern 1710

FREQUENCY HOPPING IN FULL-DUPLEX COMMUNICATIONS

TECHNICAL FIELD

The following relates to wireless communications, including frequency hopping in full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support frequency hopping in full-duplex communications. Generally, the techniques described herein may enable a wireless device, such as a user equipment (UE), to apply frequency hopping to one or more resource block (RB) sets within a slot associated with a full-duplex communication scheme, such as a sub-band full-duplex (SBFD) communication scheme in which at least one sub-band is used for uplink communications and at least one other sub-band is used for downlink communications. For example, a UE may receive an indication of a set of one or more RB sets over which the UE is to perform one or more uplink transmissions during a slot, where each RB set of the one or more RB sets is associated with a set of one or more frequency hopping parameters. The UE may select, for a first RB set of the one or more RB sets, a frequency hopping enablement status (e.g., indicating whether frequency hopping is to be used for the first RB set) or a frequency hopping pattern based on a full-duplex classification of the slot, such as an SBFD classification, and the set of one or more frequency hopping parameters for the first RB set. In some cases, the UE may disable frequency hopping for the first RB set based on the full-duplex classification of the slot. Alternatively, the UE may enable frequency hopping for the first RB set, such that the UE selects a frequency hopping pattern associated with the first RB set. In some cases, the frequency hopping pattern may be associated with a first sub-band in the slot, such that the UE may apply frequency hopping to the first RB set within the first sub-band. In some other cases, the frequency hopping pattern may be associated with the first sub-band in the slot and a second sub-band in the slot, such that the UE may apply frequency hopping to the first RB set within the first sub-band and the second sub-band.

Additionally, the UE may select a frequency hopping enablement status or a frequency hopping pattern for a second RB set of the one or more RB sets. For example, the UE may select the frequency hopping enablement status or the frequency hopping pattern for the second RB set based on the full-duplex classification of the slot and the set of one or more frequency hopping parameters for the second RB set. In some cases, the UE may disable frequency hopping for the second RB set based on the set of one or more frequency hopping parameters associated with the second resource block set. For example, at least one frequency hopping parameters of the set of one or more frequency hopping parameters for the second resource block set may be associated with a frequency that is outside of a first sub-band in the slot and a second sub-band in the slot, such that the UE may disable frequency hopping for the second RB set. Alternatively, the UE may enable frequency hopping for the second RB set and may perform frequency hopping according to the techniques described for the first RB set.

A method for wireless communications at a UE is described. The method may include receiving an indication of a set of one or more RB sets over which the UE is to perform one or more uplink transmissions during a slot, where each RB set of the one or more RB sets is associated with a set of one or more frequency hopping parameters, selecting, for a first RB set of the one or more RB sets, a frequency hopping enablement status or a frequency hopping pattern based on a full duplex classification of the slot and the set of one or more frequency hopping parameters for the first RB set, and performing the one or more uplink transmissions during the slot over the one or more RB sets in accordance with the selected frequency hopping enablement status or the selected frequency hopping pattern.

An apparatus for wireless communications at a UE is described. The apparatus may include at least one processor, memory coupled with the at least one processor, and instructions stored in the memory. The instructions may be executable by the at least one processor to cause the apparatus to receive an indication of a set of one or more RB sets over which the UE is to perform one or more uplink transmissions during a slot, where each RB set of the one or more RB sets is associated with a set of one or more frequency hopping parameters, select, for a first RB set of the one or more RB sets, a frequency hopping enablement status or a frequency hopping pattern based on a full duplex classification of the slot and the set of one or more frequency hopping parameters for the first RB set, and perform the one or more uplink transmissions during the slot over the one or more RB sets in accordance with the selected frequency hopping enablement status or the selected frequency hopping pattern.

Another apparatus for wireless communications at a UE is described. The apparatus may include means for receiving an indication of a set of one or more RB sets over which the UE is to perform one or more uplink transmissions during a slot, where each RB set of the one or more RB sets is associated with a set of one or more frequency hopping parameters, means for selecting, for a first RB set of the one or more RB sets, a frequency hopping enablement status or a frequency hopping pattern based on a full duplex classification of the slot and the set of one or more frequency hopping parameters for the first RB set, and means for performing the one or more uplink transmissions during the slot over the one or more RB sets in accordance with the selected frequency hopping enablement status or the selected frequency hopping pattern.

A non-transitory computer-readable medium storing code for wireless communications at a UE is described. The code may include instructions executable by at least one processor to receive an indication of a set of one or more RB sets over which the UE is to perform one or more uplink transmissions during a slot, where each RB set of the one or more RB sets is associated with a set of one or more frequency hopping parameters, select, for a first RB set of the one or more RB sets, a frequency hopping enablement status or a frequency hopping pattern based on a full duplex classification of the slot and the set of one or more frequency hopping parameters for the first RB set, and perform the one or more uplink transmissions during the slot over the one or more RB sets in accordance with the selected frequency hopping enablement status or the selected frequency hopping pattern.

In some examples of the method, apparatuses, and non-transitory computer-readable medium described herein, selecting the frequency hopping enablement status may include operations, features, means, or instructions for disabling frequency hopping for the first RB set based on the full duplex classification of the slot.

Some examples of the method, apparatuses, and non-transitory computer-readable medium described herein may further include operations, features, means, or instructions for receiving control signaling indicating a frequency hopping disablement rule associated with the full-duplex classification of the slot, where disabling frequency hopping may be based on the control signaling.

In some examples of the method, apparatuses, and non-transitory computer-readable medium described herein, selecting the frequency hopping pattern may include operations, features, means, or instructions for selecting a first frequency hopping pattern associated with a first sub-band in the slot based on the full duplex classification of the slot, where the first sub-band may be based on a first RB of the first RB set within the slot, where a first frequency hopping parameter of the set of one or more frequency hopping parameters for the first RB set defines the first RB.

In some examples of the method, apparatuses, and non-transitory computer-readable medium described herein, performing the one or more uplink transmissions during the slot over the one or more RB sets in accordance with the selected frequency hopping pattern may include operations, features, means, or instructions for hopping from the first RB of the first RB set to a second RB of the first RB set within the slot, where the second RB may be selected based on a second frequency hopping parameter of the set of one or more frequency hopping parameters for the first RB set, and the second RB may be specific to the first sub-band.

In some examples of the method, apparatuses, and non-transitory computer-readable medium described herein, performing the one or more uplink transmissions during the slot over the one or more RB sets in accordance with the selected frequency hopping pattern may include operations, features, means, or instructions for hopping from the first RB of the first RB set to a second RB of the first RB set within the slot, based on a second frequency hopping parameter of the set of one or more frequency hopping parameters for the first RB set, the first frequency hopping parameter of the set of one or more frequency hopping parameters for the first RB set, and a quantity of RBs in the first sub-band.

In some examples of the method, apparatuses, and non-transitory computer-readable medium described herein, selecting the first frequency hopping pattern may include operations, features, means, or instructions for selecting the first frequency hopping pattern associated with a set of sub-bands in the slot based on the full duplex classification of the slot, where the set of sub-bands includes the first sub-band and a second sub-band.

In some examples of the method, apparatuses, and non-transitory computer-readable medium described herein, performing the one or more uplink transmissions during the slot over the one or more RB sets in accordance with the selected frequency hopping pattern may include operations, features, means, or instructions for dropping transmission of the first RB of the first RB set of the one or more RB sets based on the first frequency hopping parameter of the set of one or more frequency hopping parameters for the first RB set being associated with a frequency that may be outside of the first sub-band and the second sub-band.

In some examples of the method, apparatuses, and non-transitory computer-readable medium described herein, performing the one or more uplink transmissions during the slot over the one or more RB sets in accordance with the selected frequency hopping pattern may include operations, features, means, or instructions for hopping from the first RB of the first RB set to a second RB of the first RB set within the slot based on a second frequency hopping parameter of the set of one or more frequency hopping parameters for the first RB set, and the second RB may be specific to the second sub-band.

In some examples of the method, apparatuses, and non-transitory computer-readable medium described herein, performing the one or more uplink transmissions during the slot over the one or more RB sets in accordance with the selected frequency hopping pattern may include operations, features, means, or instructions for hopping from the first RB of the first RB set to a second RB of the first RB within the slot set based on a second frequency hopping parameter of the set of one or more frequency hopping parameters for the first RB set, the first frequency hopping parameter of the set of one or more frequency hopping parameters for the first RB set, a quantity of RBs in the first sub-band, a quantity of resources in the second sub-band, and a quantity of resources in a third sub-band.

In some examples of the method, apparatuses, and non-transitory computer-readable medium described herein, the one or more uplink transmissions may be associated with a physical uplink control channel and a second frequency hopping parameter of the set of one or more frequency hopping parameters for the first RB set defines a second RB of the first RB set.

In some examples of the method, apparatuses, and non-transitory computer-readable medium described herein, the one or more uplink transmissions may be associated with a physical uplink shared channel and a second frequency hop parameter of the set of one or more frequency hopping parameters for the first RB set defines an offset from the first frequency hopping parameter.

Some examples of the method, apparatuses, and non-transitory computer-readable medium described herein may further include operations, features, means, or instructions for selecting, for a second RB set of the one or more RB sets, a frequency hopping enablement status or a frequency hopping pattern based on the full duplex classification of the slot and the set of one or more frequency hopping parameters for the second RB set.

In some examples of the method, apparatuses, and non-transitory computer-readable medium described herein, selecting the frequency hopping enablement status may include operations, features, means, or instructions for disabling frequency hopping for the second RB set of the one or more RB sets based on the set of one or more frequency hopping parameters associated with the second RB set, where at least one frequency hopping parameters of the set of one or more frequency hopping parameters for the second RB set may be associated with a frequency that may be outside of a first sub-band in the slot and a second sub-band in the slot.

Some examples of the method, apparatuses, and non-transitory computer-readable medium described herein may further include operations, features, means, or instructions for receiving control signaling indicating the set of one or more frequency hopping parameters associated with each RB set of the one or more RB sets.

In some examples of the method, apparatuses, and non-transitory computer-readable medium described herein, the slot may be a SBFD slot and the full duplex classification may be based on the SBFD slot.

A method for wireless communications at a network entity is described. The method may include outputting an indication of a set of one or more RB sets over which a UE is to perform one or more uplink transmissions during a slot, where each RB set of the one or more RB sets is associated with a set of one or more frequency hopping parameters and where the slot is associated with a full duplex classification and obtaining the one or more uplink transmissions during the slot over the one or more RB sets in accordance with a frequency hopping pattern.

An apparatus for wireless communications at a network entity is described. The apparatus may include at least one processor, memory coupled with the at least one processor, and instructions stored in the memory. The instructions may be executable by the at least one processor to cause the apparatus to output an indication of a set of one or more RB sets over which a UE is to perform one or more uplink transmissions during a slot, where each RB set of the one or more RB sets is associated with a set of one or more frequency hopping parameters and where the slot is associated with a full duplex classification and obtain the one or more uplink transmissions during the slot over the one or more RB sets in accordance with a frequency hopping pattern.

Another apparatus for wireless communications at a network entity is described. The apparatus may include means for outputting an indication of a set of one or more RB sets over which a UE is to perform one or more uplink transmissions during a slot, where each RB set of the one or more RB sets is associated with a set of one or more frequency hopping parameters and where the slot is associated with a full duplex classification and means for obtaining the one or more uplink transmissions during the slot over the one or more RB sets in accordance with a frequency hopping pattern.

A non-transitory computer-readable medium storing code for wireless communications at a network entity is described. The code may include instructions executable by at least one processor to output an indication of a set of one or more RB sets over which a UE is to perform one or more uplink transmissions during a slot, where each RB set of the one or more RB sets is associated with a set of one or more frequency hopping parameters and where the slot is associated with a full duplex classification and obtain the one or more uplink transmissions during the slot over the one or more RB sets in accordance with a frequency hopping pattern.

Some examples of the method, apparatuses, and non-transitory computer-readable medium described herein may further include operations, features, means, or instructions for outputting control signaling indicating a frequency hopping enablement status disabling frequency hopping based on the full-duplex classification of the slot, where disabling frequency hopping may be based on the control signaling.

Some examples of the method, apparatuses, and non-transitory computer-readable medium described herein may further include operations, features, means, or instructions for outputting control signaling indicating the set of one or more frequency hopping parameter associated with each RB set of the one or more RB sets.

In some examples of the method, apparatuses, and non-transitory computer-readable medium described herein, the one or more uplink transmissions may be associated with a physical uplink control channel, and where the set of one or more parameters associated with each RB set of the one or more RB sets includes a first frequency hop parameter associated with a first RB of a respective RB set and a second frequency hop parameter associated with a second RB of the respective RB set.

In some examples of the method, apparatuses, and non-transitory computer-readable medium described herein, the one or more uplink transmissions may be associated with a physical uplink shared channel, and where the set of one or more parameters associated with each RB set of the one or more RB sets includes a first frequency hop parameter associated with a first RB of a respective RB set and a second frequency hop parameter associated with an offset from the first RB.

In some examples of the method, apparatuses, and non-transitory computer-readable medium described herein, the slot may be a SBFD slot and the full duplex classification may be based on the SBFD slot.

BRIEF DESCRIPTION OF THE DRAWINGS

FIGS. 14 through 17 show flowcharts illustrating methods that support frequency hopping in full-duplex communications in accordance with one or more aspects of the present disclosure.

DETAILED DESCRIPTION

Figure 1:
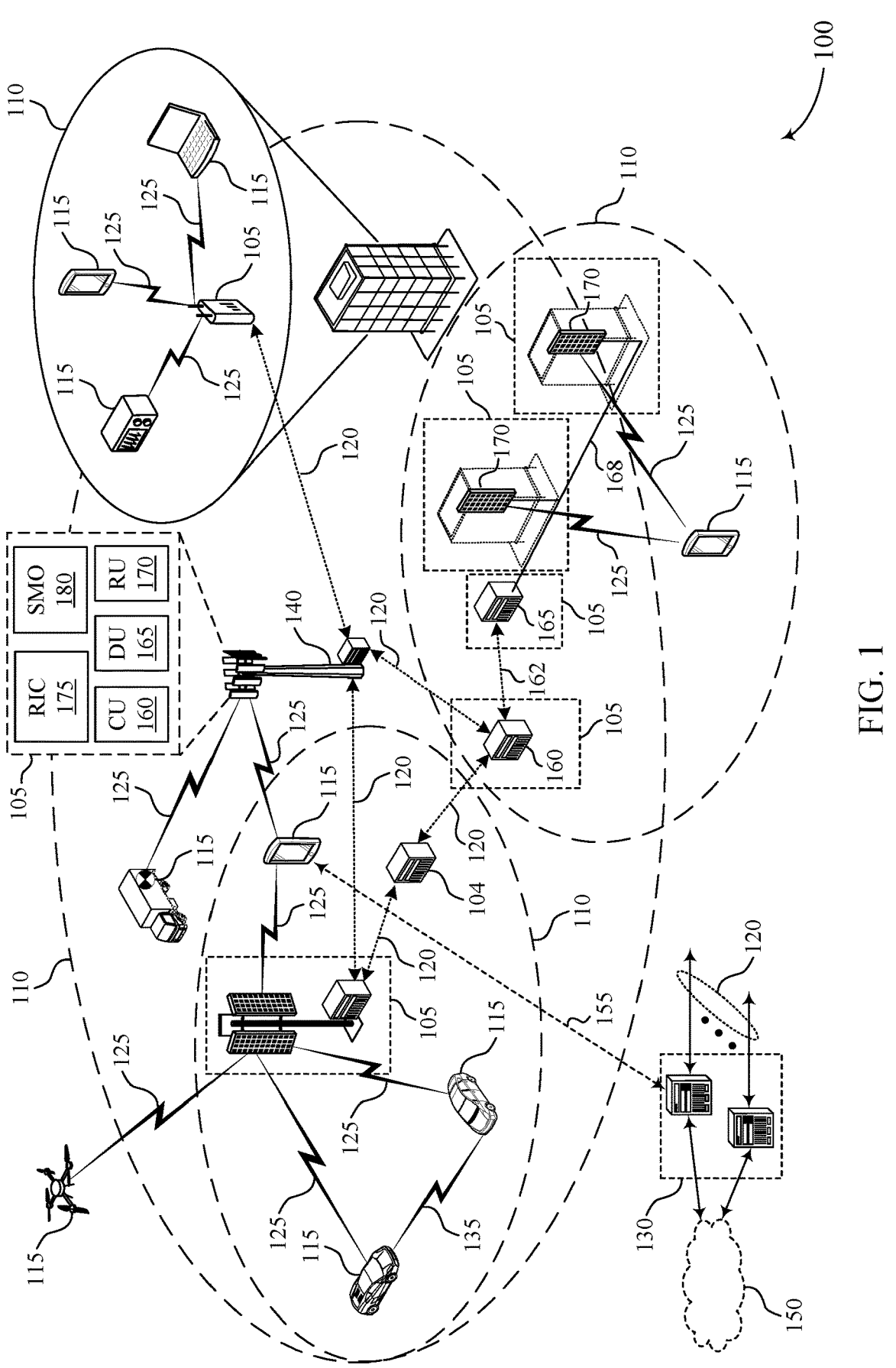
FIG. 1 illustrates an example of a wireless communications system that supports frequency hopping in full-duplex communications in accordance with one or more aspects of the present disclosure.

Some wireless communications may support frequency hopping for uplink transmissions. For example, a user equipment (UE) may receive control signaling including an indication of one or more uplink resources, such as a first resource block (RB) and a second RB in an RB set, over which the UE is to perform one or more uplink transmissions during a slot. Additionally, the RB set may be associated with a set of one or more frequency hopping parameters such that the UE may hop from the first RB to the second RB according to the set of one or more frequency hopping parameters. Further, the UE may transmit the one or more uplink messages during the slot over the RB set. Additionally, some wireless communications may support full-duplex communications, such as sub-band full-duplex (SBFD) communications, in which the UE may transmit uplink communications and receive downlink communications over a same time resource and one or more different frequency resources. For example, a slot, which may be referred to as an SBFD slot, may include one or more uplink sub-bands and one or more downlink sub-bands. However, conventional techniques may not support frequency hopping for one or more RB sets in full-duplex communications, such as SBFD communications due to a slot containing one or more downlink sub-bands which may not be used for uplink transmissions.

Accordingly, techniques described herein may support frequency hopping in full-duplex communications. That is, a UE may support frequency hopping for one or more RB sets within a slot associated with a full-duplex communication scheme, such as SBFD communications. For example, the UE may receive, from a network entity, an indication of a set of one or more RB sets, including at least a first RB set, over which the UE is to perform one or more uplink transmissions during a slot. Additionally, each RB set of the one or more RB sets may be associated with a set of frequency hopping parameters, including at least a first set of frequency hopping parameters associated with the first RB set. In some cases, the UE may select, for the first RB set, a frequency hopping enablement status based on a full-duplex classification of the slot and the first set of one or more frequency hopping parameters for the first RB set. That is, the UE may determine to enable or disable frequency hopping for the first RB set based on the slot being an SBFD slot, the first set of one or more frequency hopping parameters for the first RB set, or both. Additionally, or alternatively, the UE may select a frequency hopping pattern based on the full-duplex classification of the slot and the first set of one or more frequency hopping parameters for the first RB set. For example, the UE may select a first frequency hopping pattern associated with a first sub-band of the slot or a second frequency hopping pattern associated with a set of sub-bands of the slot, including the first sub-band and a second sub-band.

Additionally, the UE may support frequency hopping for a second RB set of the one or more RB sets, where the second RB set is associated with a second set of frequency hopping parameters. For example, the UE may select, for the second RB set, a frequency hopping enablement status or a frequency hopping pattern based on the full-duplex classification of the slot and the second set of one or more frequency hopping parameters for the first RB set. In some cases, the UE may perform the one or more uplink transmissions during the slot over the one or more RB sets in accordance with the selected frequency hopping enablement status or the selected frequency hopping pattern for the first RB set, the second RB set, or both.

Aspects of the disclosure are initially described in the context of wireless communications systems. Aspects of the disclosure are then described in the context of SBFD communications schemes and a process flow. Aspects of the disclosure are further illustrated by and described with reference to apparatus diagrams, system diagrams, and flowcharts that relate to frequency hopping in full-duplex communications.

FIG. 1 illustrates an example of a wireless communications system 100 that supports frequency hopping in full-duplex communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support frequency hopping in full-duplex communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/health-care device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using (e.g., over) resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/ (\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the wireless communications systems 100 may support frequency hopping in full-duplex communications. That is, a UE 115 may support frequency hopping for one or more RB sets within a slot associated with a full-duplex communication scheme, such as SBFD communications. For example, the UE 115 may receive, from a network entity 105, an indication of a set of one or more RB sets, including at least a first RB set, over which the UE 115 is to perform one or more uplink transmissions during a slot. Additionally, each RB set of the one or more RB sets may be associated with a set of frequency hopping parameters, including at least a first set of frequency hopping parameters associated with the first RB set. For example, a set of frequency hopping parameters associated with an RB set may include a first frequency hopping parameter indicating a first RB of the RB set (e.g., startingPRB or RBstart) and a second frequency hopping parameter indicating a second RB of the RB set (e.g., secondHopPRB or RBoffset). In some cases, the first frequency hopping parameter may define a starting RB (e.g., prior to frequency hopping) and the second frequency hopping parameter may define or indicate a hopping interval. In some cases, the UE 115 may select, for the first RB set, a frequency hopping enablement status based on a full-duplex classification of the slot and the first set of one or more frequency hopping parameters for the first RB set. That is, the UE 115 may determine to enable or disable frequency hopping for the first RB set based on the slot being an SBFD slot and the first set of one or more frequency hopping parameters for the first RB set. Additionally, or alternatively, the UE 115 may select a frequency hopping pattern based on the full-duplex classification of the slot and the first set of one or more frequency hopping parameters for the first RB set. For example, the UE 115 may select a first frequency hopping pattern associated with a first sub-band of the slot or a second frequency hopping pattern associated with a set of sub-bands of the slot, including the first sub-band and a second sub-band.

Additionally, the UE 115 may support frequency hopping for a second RB set of the one or more RB sets, where the second RB set is associated with a second set of frequency hopping parameters. For example, the UE 115 may select, for the second RB set, a frequency hopping enablement status or a frequency hopping pattern based on the full-duplex classification of the slot and the second set of one or more frequency hopping parameters for the first RB set. In some cases, the UE 115 may perform the one or more uplink transmissions during the slot (e.g., over the slot) over (e.g., using) the one or more RB sets in accordance with the selected frequency hopping enablement status or the selected frequency hopping pattern for the first RB set, the second RB set, or both.

Figure 2:
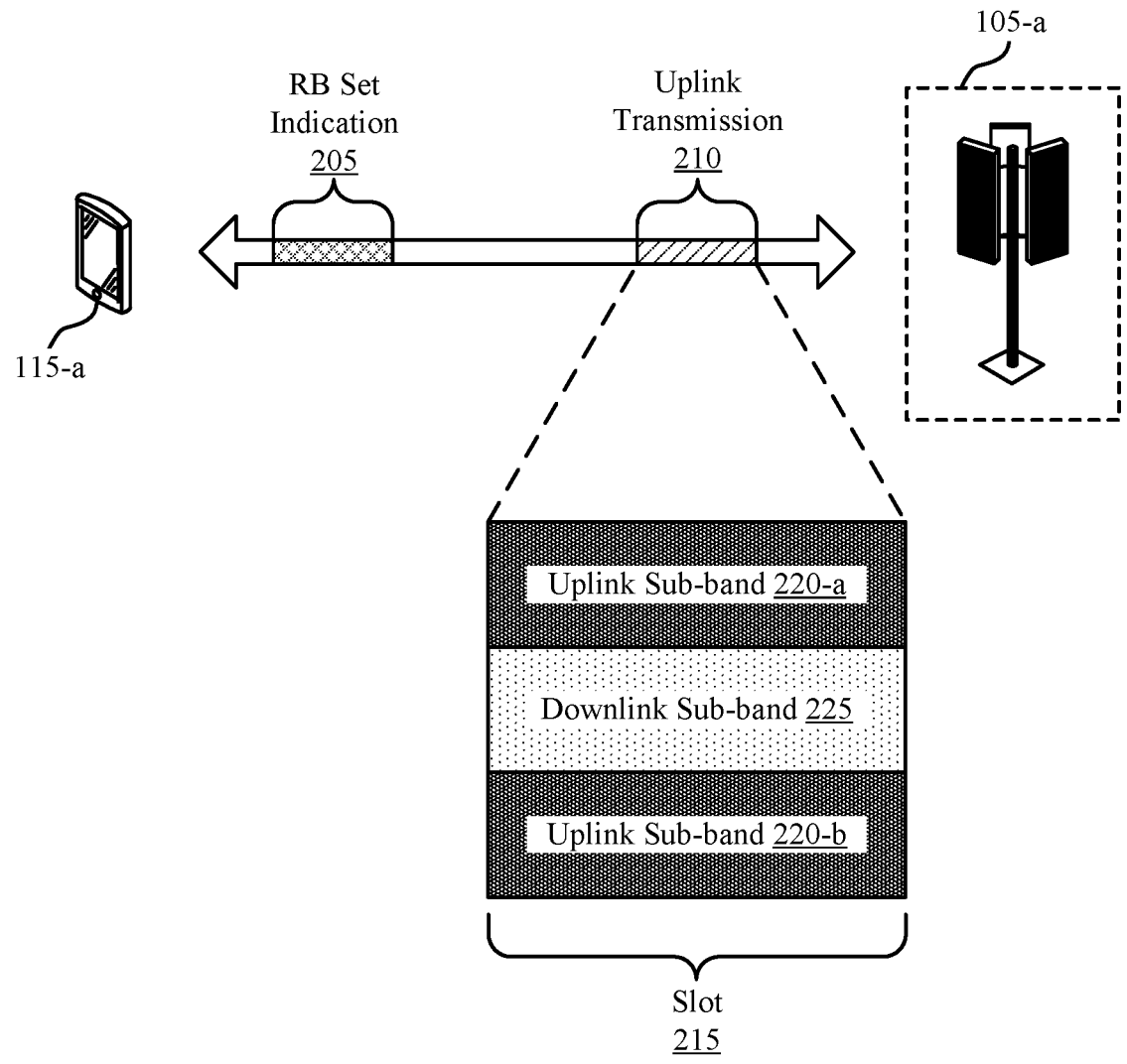
FIG. 2 illustrates an example of a wireless communications system that supports frequency hopping in full-duplex communications in accordance with one or more aspects of the present disclosure.

FIG. 2 illustrates an example of a wireless communications system 200 that supports frequency hopping in full-duplex communications in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-a) and one or more UEs 115 (e.g., a UE 115-a), which may be examples of the corresponding devices described with reference to FIG. 1. In the example of FIG. 2, the network entity 105-a may be examples of a CU 160, a DU 165, an RU 170, a base station 140, an IAB node 104, or one or more other network nodes as described with reference to FIG. 1. In some cases, the UE 115-a may select a frequency hopping enablement status or a frequency hopping pattern for an RB set of one or more RB sets indicated to the UE 115-a.

Some wireless communications systems, such as the wireless communications system 200, may support frequency hopping for uplink transmissions, such as an uplink transmission 210, which may be as physical uplink shared channel (PUSCH) transmissions, physical uplink control channel (PUCCH) transmissions, or both. For example, a UE 115 may receive control signaling including an indication (e.g., resource configuration) of one or more uplink resources (e.g., PUCCH or PUSCH resources), which may be referred to as an RB set indication 205, over which the UE 115 is to perform one or more uplink transmissions 210 during a slot (e.g., uplink slot). In some examples, the RB set indication 205 may indicate an RB set including a first RB and a second RB. Additionally, the RB set may be associated with a set of frequency hopping parameters (e.g., indicated in the control signaling or pre-configured at the UE 115). For example, the set of frequency hopping parameters associated with the RB set may include a first frequency hopping parameter associated with the first RB of the RB set (e.g., startingPRB or RBstart) and a second frequency hopping parameter associated with the second RB of the RB set (e.g., secondHopPRB or RBoffset). In some cases, the first frequency hopping parameter may define the first RB (e.g., prior to frequency hopping) and the second frequency hopping parameter may define the second RB (e.g., after frequency hopping). For example, the first frequency hopping parameter may define a location of the first RB within the slot (e.g., a first hop within the slot) and the second frequency hopping parameter may define a location the second RB within the slot (e.g., a second hop within the slot). In another example, the second frequency hopping parameter may define the second RB within the slot relative to the first RB. That is, the UE 115 may determine the location of the first RB (e.g., a first hop within the slot) based on the first frequency hopping parameter (e.g., RBstart) and the location of the second RB (e.g., a second hop within the slot) based on the second frequency hopping parameter, where the second frequency hopping parameter is defined by an offset according to the following Equation 1:

$$RB_{Start} = \begin{cases} RB_{Start}, & i = 0 \\ (RB_{Start} + RB_{Offset}) \bmod N_{BWP}^{size}, & i = 1 \end{cases} \quad (1)$$

where the parameter $RB_{start}$ may represent the first frequency hopping parameter for the first RB of the RB set, the parameter $RB_{offset}$ may represent the second frequency hopping parameter for the second RB of the RB set, the parameter $$N_{BWP}^{size}$$

may represent a size of a bandwidth part associated with the slot, and the parameter i may represent a hop index (e.g., a first hop is associated with an index value of 0 and a second hop is associated with an index value of 1). Additionally, or alternatively, the set of frequency hopping parameters may include an indication for the UE 115 to perform one or more uplink transmissions 210 over (e.g., using) the first RB set in accordance with the set of one or more frequency hopping parameters (e.g., an indication for intra-slot frequency hopping by intraslotFrequencyHopping).

In some cases (e.g., PUCCH frequency hopping), the UE 115 may support frequency hopping for multiple uplink transmission formats (e.g., PUCCH formats 0, 1, 2, 3, or 4). For example, the UE 115 may support frequency hopping for a first set of uplink formats (e.g., PUCCH formats 1, 3, or 4) in which a quantity of symbols for a first hop is given by $$\mathrm{floor}\left(\frac{N_{symb}^{Uplink}}{2}\right)$$

where $$N_{symb}^{Uplink}$$

is the length of a corresponding uplink transmission (e.g., in OFDM symbols). In such cases, a second hop may be defined by $$N_{symb}^{Uplink} - \mathrm{floor}\left(\frac{N_{symb}^{Uplink}}{2}\right).$$

Additionally, or alternatively, the UE 115 may support frequency hopping for a second set of uplink formats (e.g., PUCCH formats 0 or 2) in which a quantity of symbols for a first hop is two symbols. Frequency hopping may support enhanced uplink coverage and frequency diversity.

Additionally, some wireless communications systems, such as the wireless communications system 200, may support full-duplex communications. For example, a UE 115, among other wireless devices, operating within the wireless communications system 200 may support in-band full-duplex (IBFD) operations, sub-band FD (SBFD) operations (e.g., frequency duplex operations), or both. In some examples of IBFD operations, the communication device may transmit and receive wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap.

Additionally, or alternatively, for SBFD operations, the UE 115 may transmit and receive communications over a same time resource and over one or more different frequency resources. That is, the downlink resources may be separated from the uplink resource in the frequency domain. For example, a UE 115 may support SBFD operations, such that downlink communications transmitted from a network entity 105 (e.g., to the UE 115) may overlap in time with uplink communications (e.g., uplink transmissions 210) transmitted to the network entity 105, or another network entity 105 (e.g., from the UE 115). In some examples, the network entity 105 may configure the UE 115 according to a resource structure supporting SBFD operations. That is, the resource structure may include time domain resources (e.g., slots) allocated for downlink data, time domain resources allocated for uplink data, and one or more time domain resources allocated for both downlink data and uplink data, such as a slot 215. In some cases, the time domain resources allocated or both downlink data and uplink data may be associated with a full-duplex classification of the time domain resources, which may be referred to as an SBFD slot 215. For example, a radio frequency band associated with an SBFD slot 215 may be used for both transmitting uplink communications (e.g., uplink transmissions) and receiving downlink communications (e.g., downlink transmission) in which the uplink transmissions and the downlink transmissions may occur in adjacent sub-bands (e.g., within the radio frequency band). In some cases, the one or more time domain resources allocated for both downlink data and uplink data may include a first sub-band allocated for downlink transmissions (e.g., a downlink sub-band), a second sub-band allocated for uplink transmissions (e.g., an uplink sub-band), and a third sub-band allocated for downlink transmissions (e.g., a downlink sub-band), where the second sub-band is located between the first sub-band and the second sub-band. In some other cases, the one or more time domain resources allocated for both downlink data and uplink data may include a first sub-band allocated for uplink transmissions (e.g., an uplink sub-band 220-a), a second sub-band allocated for downlink transmissions (e.g., a downlink sub-band 225), and a third sub-band allocated for uplink transmissions (e.g., an uplink sub-band 220-b), where the second sub-band is located between the first sub-band and the third sub-band. That is, the sub-bands allocated for uplink transmissions may be dis-joint sub-bands.

Additionally, or alternatively, a UE 115 may receive control signaling (e.g., downlink control information (DCI)) indicating multiple RB sets over which the UE 115 is to perform one or more uplink transmissions 210 (e.g., to two different transmission and reception points (TRPs)) during a slot 215, which may be an SBFD slot 215, and each RB set of the multiple RB sets may be associated with a set of one or more frequency hopping parameters (e.g., to achieve higher diversity). That is, an RB set indication 205 may include an indication of the multiple RB sets over which the UE 115 is to perform the one or more uplink transmissions 210.

However, conventional techniques may not support frequency hopping for full-duplex operations, such as SBFD operations. That is, a UE 115 may receive an indication of one or more RB sets, such as an RB set indication 205, over which the UE 115 is to perform one or more uplink transmissions 210 during a slot 215, which may be an SBFD slot 215, where each RB set of the one or more RB sets may be associated with one or more frequency hopping parameters. Additionally, one or more frequency hopping parameters associated with a first RB set of the one or more RB sets, a second RB set of the one or more RB sets, or both, may define one or more RBs of the first RB set, the second RB set, or both, within a downlink sub-band 225 (e.g., that may not be used for uplink transmissions 210).

As such, techniques described herein may enable frequency hopping for full-duplex operations. For example, a UE 115, such as the UE 115-a, may receive an RB set indication 205 indicating one or more RB sets over which the UE 115-a is to perform one or more uplink transmissions 210 in a slot 215. Additionally, each RB set of the one or more RB sets may be associated with a set of one or more frequency hopping parameters. Each set of one or more frequency hopping parameters may define a first RB of a respective RB set and a second RB of the respective RB set. Further, the slot 215 may be associated with a full-duplex classification. That is, the slot 215 may be classified as an SBFD slot 215, where the slot 215 includes an uplink sub-band 220-a and an uplink sub-band 220-b separated by a downlink sub-band 225 (e.g., dis-joint uplink sub-bands 220).

In some cases, the UE 115-a may select, for the each RB set of the one or more RB sets, a frequency hopping enablement status based on a full-duplex classification of the slot 215 and the respective set of one or more frequency hopping parameters. That is, the UE 115 may determine to enable or disable frequency hopping for each RB set based on the slot 215 being an SBFD slot 215 and the respective set of one or more frequency hopping parameters. Additionally, or alternatively, the UE 115 may select a frequency hopping pattern for each RB set (e.g., enabled for frequency hopping) based on the full-duplex classification of the slot 215 and the respective set of one or more frequency hopping parameters. For example, the UE 115 may select a first frequency hopping pattern associated with the uplink sub-band 220-a, a second frequency hopping pattern associated with the uplink sub-band 220-b, or a third or a third frequency hopping pattern associated with the uplink sub-band 220-a and the uplink sub-band 220-b, as described with reference to FIG. 3. Additionally, the UE 115-a may perform the one or more uplink transmissions 210 during the slot 215 based on the selected frequency hopping enablement status or the selected frequency hopping pattern for each RB set of the one or more RB sets.

Figure 3:
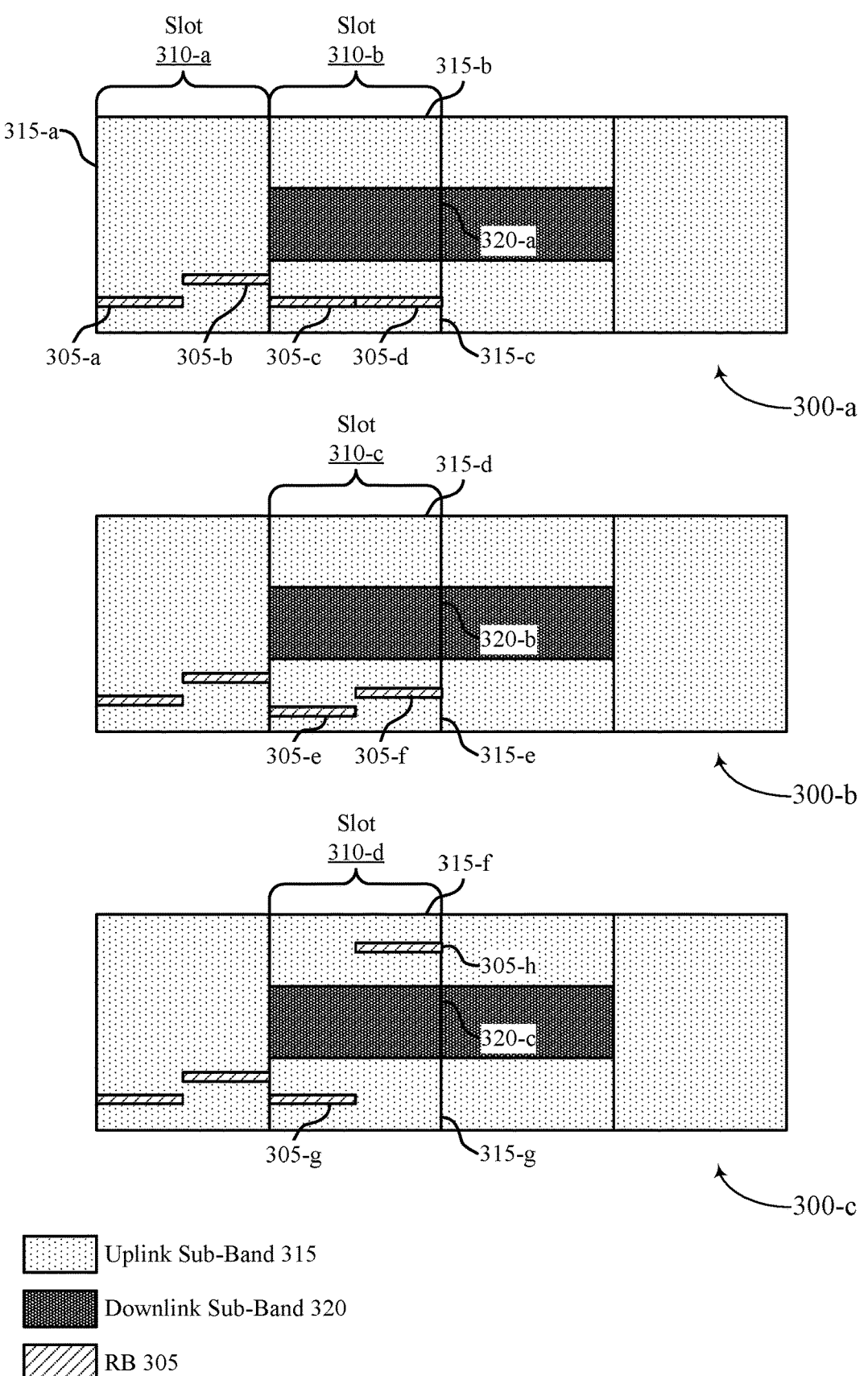
FIG. 3 illustrates an example of sub-band full-duplex (SBFD) communication schemes that supports frequency hopping in full-duplex communications in accordance with one or more aspects of the present disclosure.

FIG. 3 illustrates an example of SBFD communication schemes 300 that supports frequency hopping in full-duplex communications in accordance with one or more aspects of the present disclosure. In some examples, the SBFD communication schemes 300 may implement or be implemented by aspects of the wireless communications system 100 and the wireless communications system 200. For example, the SBFD communication schemes 300 may be implemented by one or more network entities 105 and one or more UEs 115, which may be examples of the corresponding devices described with reference to FIG. 1. In some cases, a UE 115 may select a frequency hopping enablement status or a frequency hopping pattern for an RB set in which the UE 115 is to perform one or more uplink transmissions based on a full-duplex classification of a slot 310 and a set of one or more frequency hopping parameters associated with the RB set.

In some cases, a UE 115 may receive an indication (e.g., via DCI) of an RB set, including multiple RBs 305, over which the UE 115 is to perform one or more uplink transmissions over a slot 310. For example, as depicted in SBFD communications scheme 300-a, the UE 115 may receive an indication of a first RB set, including an RB 305-a and an RB 305-b, over which the UE 115 is to perform one or more uplink transmissions during the slot 310-a, where the slot 310-a is allocated for uplink transmissions and includes an uplink sub-band 315-a. Additionally, the first RB set may be associated with a set one or more of frequency hopping parameters, such that a first frequency hopping parameter of the set one or more of frequency hopping parameters is associated with the RB 305-a and a second frequency hopping parameter of the set one or more of frequency hopping parameters is associated with the RB 305-b. Further, the UE 115 may perform the one or more uplink transmissions during the slot 310-a over the RB 305-a and the RB 305-b in accordance with the set of one or more frequency hopping parameters based on the slot 310-a being allocated to uplink transmissions.

In another example, as depicted in the SBFD communications scheme 300-a, the UE 115 may receive an indication of a second RB set, including an RB 305-c and an RB 305-d, over which the UE 115 is to perform one or more uplink transmissions during the slot 310-b, where the slot 310-b is allocated for uplink transmissions and downlink transmissions. That is, the slot 310-b may be an SBFD slot 310-b (e.g., classified as a full-duplex slot 310) and includes an uplink sub-band 315-b and an uplink sub-band 315-c, separated by a downlink sub-band 320-a. In some cases, the UE 115 may disable frequency hopping for the second RB set, including the RB 305-c and the RB 305-d, based on the slot 310-b being an SBFD slot 310-b (e.g., based on the full-duplex classification of the slot 310-b). As such, the UE 115 may perform the one or more uplink transmissions over the RB 305-c and the RB 305-d during the slot 310-b based on disabling frequency hopping (e.g., without performing frequency hopping).

In another example, as depicted in the SBFD communications scheme 300-b, the UE 115 may receive an indication of a third RB set, including an RB 305-e and an RB 305-f, over which the UE 115 is to perform one or more uplink transmissions during the slot 310-c, where the slot 310-c is allocated for uplink transmissions and downlink transmissions. That is, the slot 310-c may be an SBFD slot 310-c (e.g., classified as a full-duplex slot 310) and includes an uplink sub-band 315-d and an uplink sub-band 315-e, separated by a downlink sub-band 320-b. In some cases, the UE 115 may select a frequency hopping pattern for the third RB set, including the RB 305-e and the RB 305-f, based on the slot 310-c being an SBFD slot 310-c and based on a set of one or more frequency hopping parameters associated with the third RB set, including a first frequency hopping parameter associated with the RB 305-e (e.g., startingPRB or RBstart) and a second frequency hopping parameter associated with the RB 305-f (e.g., secondHopPRB or RBoffset). That is, the UE 115 may perform frequency hopping for the third RB set is the uplink sub-band 315-e (e.g., the UE 115 is configured to confine frequency hopping for the third RB set within one uplink sub-band 315). In some cases, the UE 115 may select the frequency hopping pattern for the third RB set based on the first frequency hopping parameter associated with the RB 305-e. That is, the UE 115 may apply frequency hopping in the uplink sub-band 315-e based on a value associated with the first frequency hopping parameter associated with the RB 305-e being within the uplink sub-band 315-e. In other words, the frequency hopping pattern for the third RB set may be associated with the uplink sub-band 315-e.

Additionally, the UE 115 may hop from the RB 305-e to the RB 305-f (e.g., a second hop) within the uplink sub-band 315-e of the slot 310-c. In some cases, the RB 305-f may be selected based on the second frequency hopping parameter associated with the RB 305-f (e.g., the set of one or more frequency hopping parameters for the third RB set may be configured for SBFD slots 310). That is, the second frequency hopping parameter associated with the RB 305-f may be associated with the uplink sub-band 315-e in the SBFD slot 310-c (e.g., a separately configured secondHopPRB may be defined for each uplink sub-band 315 in an SBFD slot 310 with two uplink sub-bands 315).

In some other cases, the UE 115 may hop from the RB 305-e to the RB 305-f within the uplink sub-band 315-e of the slot 310-c based on the first frequency hopping parameter associated with the RB 305-e, a second frequency hopping parameter associated with the RB 305-f (e.g., half-duplex secondHopPRB), and a quantity of resource blocks in the uplink sub-band 315-e (e.g., a set of frequency hopping parameters for an RB set in a non-SBFD slot 310 may be the same as the set of frequency hopping parameters for third RB set in the SBFD slot 310-c). That is, the UE may hop from the RB 305-e to the RB 305-f according to the following equation 2:

$$\text{SecondHopRB} = \text{mod}(\text{startingPRB} + (\text{secondHopPRB} - \text{startingPRB})), N_{sub\text{-}band}) \quad (2)$$

where the parameter SecondHopRB may represent the hop from the RB 305-e to the RB 305-f, the parameter startingPRB may represent the first frequency hopping parameter associated with the RB 305-e, the parameter secondHopPRB may represent the second frequency hopping parameter associated with the RB 305-f (e.g., half-duplex frequency hopping parameter for RB 305-f), and the parameter $N_{sub\text{-}band}$ may represent a quantity of RBs 305 in the uplink sub-band 315-e.

Additionally, the UE 115 may perform the one or more uplink transmissions over the RB 305-e and the RB 305-f during the slot 310-c based on the selected frequency hopping pattern associated with the uplink sub-band 315-e. In another example, not depicted, the UE 115 may apply frequency hopping in the uplink sub-band 315-d based on a value associated with the first frequency hopping parameter associated with the RB 305-e being within the uplink sub-band 315-d. That is, the frequency hopping pattern for the third RB set is associated with the uplink sub-band 315-d.

In another example, as depicted in the SBFD communications scheme 300-c, the UE 115 may receive an indication of a fourth RB set, including an RB 305-g and an RB 305-h, over which the UE 115 is to perform one or more uplink transmissions during the slot 310-d, where the slot 310-d is allocated for uplink transmissions and downlink transmissions. That is, the slot 310-d may be an SBFD slot 310-d (e.g., classified as a full-duplex slot 310) and includes an uplink sub-band 315-f and an uplink sub-band 315-g, separated by a downlink sub-band 320-c. In some cases, the UE 115 may select a frequency hopping pattern for the fourth RB set, including the RB 305-g and the RB 305-h, based on the slot 310-d being an SBFD slot 310-d and based on a set of one or more frequency hopping parameters associated with the fourth RB set, including a first frequency hopping parameter associated with the RB 305-g (e.g., startingPRB or RBstart) and a second frequency hopping parameter associated with the RB 305-h (e.g., secondHopPRB or RBoffset). That is, the frequency hopping pattern for the fourth RB set may be associated with the uplink sub-band 315-f and the uplink sub-band 315-g (e.g., the UE 115 may be configured to perform frequency hopping over two uplink sub-bands 315).

In some cases, the UE 115 may determine a location of the RB 305-g (e.g., a location of a first hop) based on the first frequency hopping parameter associated with the RB 305-g. For example, the first frequency hopping parameter may be associated with the SBFD slot 310-c (e.g., with two dis-joint uplink sub-bands 315). In another example, the first frequency hopping parameter may be independent of the SBFD slot 310-c (e.g., associated with half-duplex operations). In some cases, the UE 115 may drop an uplink transmission associated with the RB 305-g based on the first frequency hopping parameter being associated with a frequency that is outside of the uplink sub-band 315-f and the uplink sub-band 315-g (e.g., within the downlink sub-band 320-c).

In some cases, the UE 115 may determine a location of the RB 315-h (e.g., a location of a second hop) based on the second frequency hopping parameter associated with the RB 305-h. For example, the second frequency hopping parameter may be associated with the SBFD slot 310-c (e.g., with two dis-joint uplink sub-bands 315). In some other cases, the UE 115 may determine the location of the RB 315-*h* based according to the following equation 3:

$$\text{SecondHopRB=mod(startingPRB+(secondHopPRB-}$$
$$\text{startingPRB)}+N_{DL}),N_{sub\_band1}+N_{sub\_band2}) \quad (3)$$

where the parameter SecondHopRB may represent the hop from the RB 305-*g* to the RB 305-*h*, the parameter startingPRB may represent the first frequency hopping parameter associated with the RB 305-*g*, the parameter secondHopPRB may represent the second frequency hopping parameter associated with the RB 305-*h* (e.g., half-duplex frequency hopping parameter for RB 305-*h*), the parameter $N_{DL}$ may represent a quantity of RBs 305 in the downlink sub-band 320-*c* (e.g., and guard bands separating the downlink sub-band 320-*c* and the uplink sub-bands 315-*f* and the uplink sub-band 315-*g*), the parameter $N_{sub\text{-}band1}$ may represent a quantity of RBs 305 in the uplink sub-band 315-*f*, and the parameter $N_{sub\text{-}band2}$ may represent a quantity of RBs 305 in the uplink sub-band 315-*g*.

While much of the present disclosure is described in the context of a slot 310 including two downlink sub-bands 320 separated by an uplink sub-band 315, this is not to be regarded as a limitation of the present disclosure. In this regard, a slot 310 allocated for uplink transmissions and downlink transmissions may include any quantity of uplink sub-bands 315 and any quantity of downlink sub-bands 320.

Figure 4:
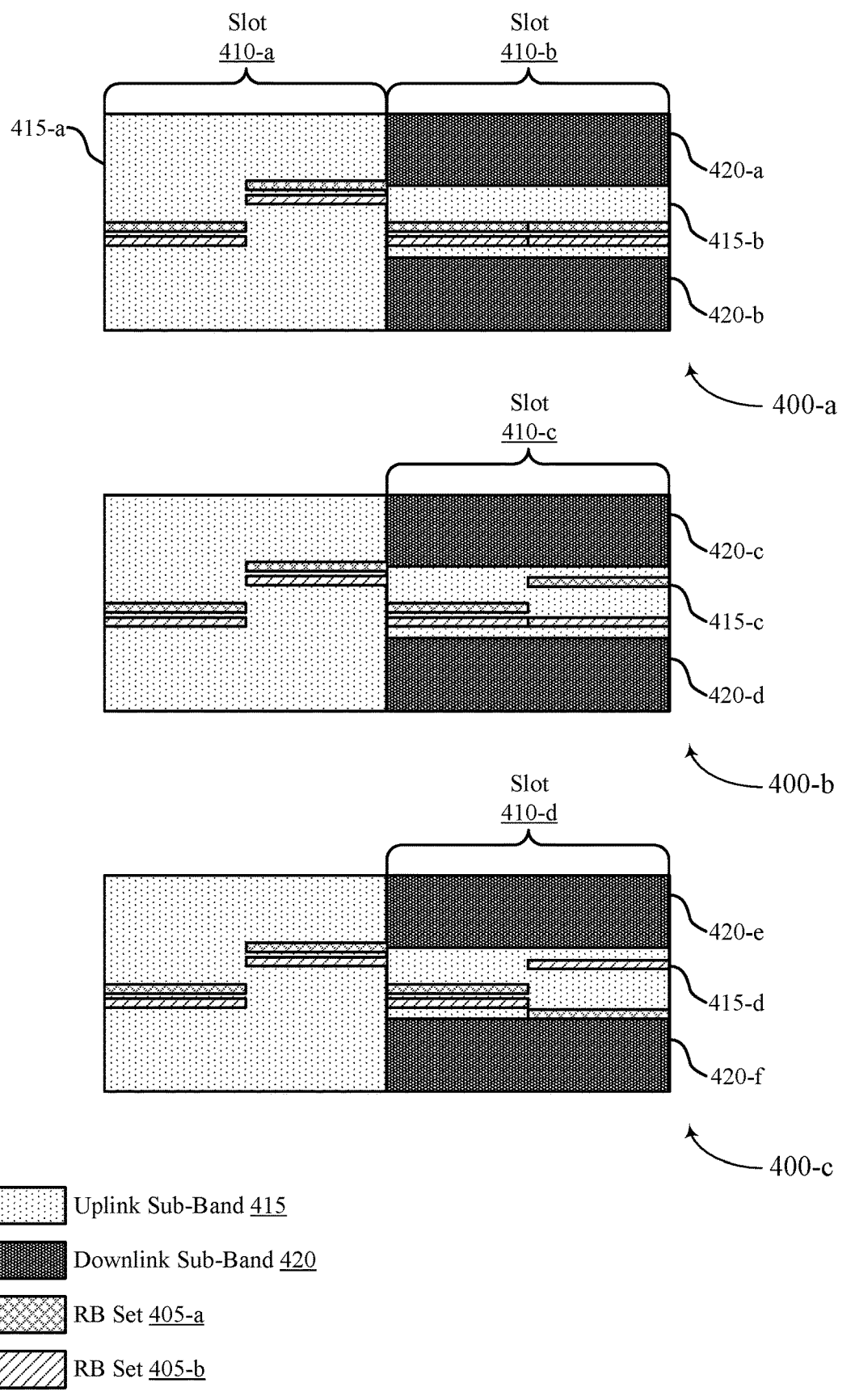
FIG. 4 illustrates an example of SBFD communication schemes that supports frequency hopping in full-duplex communications in accordance with one or more aspects of the present disclosure.

FIG. 4 illustrates an example of SBFD communication schemes 400 that supports frequency hopping in full-duplex communications in accordance with one or more aspects of the present disclosure. In some examples, the SBFD communication schemes 400 may implement or be implemented by aspects of the wireless communications system 100, the wireless communications system 200, and the SBFD communication schemes 300. For example, the SBFD communication schemes 400 may be implemented by one or more network entities 105 and one or more UEs 115, which may be examples of the corresponding devices described with reference to FIG. 1. In some cases, a UE 115 may select a frequency hopping enablement status or a frequency hopping pattern for an RB set 405-*a* and an RB set 405-*b* based on a full-duplex classification of a slot 310 and a set of one or more frequency hopping parameters associated with each RB SET 405.

In some cases, a UE 115 may receive an indication (e.g., via DCI) of multiple RB sets 405, each including multiple RBs, over which the UE 115 is to perform one or more uplink transmissions over a slot 410. For example, as depicted in SBFD communications scheme 400-*a*, the UE 115 may receive an indication of an RB set 405-*a* and an RB set 405-*b* over which the UE 115 is to perform one or more uplink transmissions during the slot 410-*a*, where the slot 410-*a* is allocated for uplink transmissions and includes an uplink sub-band 415-*a*. Additionally, the RB set 405-*a* may be associated with a first set one or more of frequency hopping parameters and the RB set 405-*b* may be associated with a second set of one or more frequency hopping parameters. Further, the UE 115 may perform the one or more uplink transmissions during the slot 410-*a* over the RB set 405-*a* and the RB set 405-*b* in accordance with the first set of one or more frequency hopping parameters and the second set of one or more frequency hopping parameters based on the slot 410-*a* being allocated to uplink transmissions. In some cases, with the first set of one or more frequency hopping parameters and the second set of one or more frequency hopping parameters may be the same or different.

In another example, as depicted in the SBFD communications scheme 400-*a*, the UE 115 may receive an indication of the RB set 405-*a* and the RB set 405-*b* over which the UE 115 is to perform one or more uplink transmissions during the slot 410-*b*, where the slot 410-*b* is allocated for uplink transmissions and downlink transmissions. That is, the slot 410-*b* may be an SBFD slot 410-*b* (e.g., be associated with a full-duplex classification) and include a downlink sub-band 420-*a* and a downlink sub-band 420-*b*, separated by an uplink sub-band 415-*b*. In some cases, the UE 115 may disable frequency hopping for the RB set 405-*a* and the RB set 405-*b* (e.g., frequency hopping is disabled for all RB sets 405) based on the full-duplex classification of the slot 410-*b*. As such, the UE 115 may perform the one or more uplink transmissions over the RB set 405-*a* and the RB set 405-*b* during the slot 410-*b* based on disabling frequency hopping (e.g., without performing frequency hopping).

In another example, as depicted in the SBFD communications scheme 400-*b*, the UE 115 may receive an indication of the RB set 405-*a* and the RB set 405-*b* over which the UE 115 is to perform one or more uplink transmissions during the slot 410-*c*, where the slot 410-*c* is allocated for uplink transmissions and downlink transmissions. That is, the slot 410-*c* may be an SBFD slot 410-*c* and may include a downlink sub-band 420-*c* and a downlink sub-band 420-*d*, separated by an uplink sub-band 415-*c*. In some cases, the UE 115 may enable frequency hopping for the RB set 405-*a* and disable frequency hopping for the RB set 405-*b* (e.g., may enable frequency hopping for only one RB set 405). That is, the UE 115 may select a frequency hopping pattern for the RB set 405-*a*, as described with reference with FIG. 3, and disable frequency hopping for the RB set 405-*b*. In some cases, the UE 115 may select the frequency hopping pattern for the RB set 405-*a* based on the first set of one or more frequency hopping parameters and disable frequency hopping for the RB set 405-*b* based on the second set of one or more frequency hopping parameters. That is, one or more frequency hopping parameters of the second set of one or more frequency hopping parameters may be associated with a frequency that is outside of the uplink sub-band 415-*c*. In some cases, the UE 115 may disable frequency hopping for the RB set 405-*a* and the RB set 405-*b* based on one or more frequency hopping parameters of the first set of one or more frequency hopping parameters and one or more frequency hopping parameters of the second set of one or more frequency hopping parameters being associated with respective frequencies that are outside of the uplink sub-band 415-*c*.

In another example, as depicted in the SBFD communications scheme 400-*c*, the UE 115 may receive an indication of the RB set 405-*a* and the RB set 405-*b* over which the UE 115 is to perform one or more uplink transmissions during the slot 410-*d*, where the slot 410-*d* is allocated for uplink transmissions and downlink transmissions. That is, the slot 410-*d* may be an SBFD slot 410-*d* and may include a downlink sub-band 420-*e* and a downlink sub-band 420-*f*, separated by an uplink sub-band 415-*d*. In some cases, the UE 115 may enable frequency hopping for the RB set 405-*a* and the RB set 405-*b* (e.g., may enable frequency hopping for both RB sets 405). That is, the UE 115 may select a first frequency hopping pattern for the RB set 405-*a* and a second frequency hopping pattern for the RB set 405-*b*, as described with reference to FIG. 3. In some cases, one or more parameters of the first set of frequency hopping parameters, of the second set of frequency hopping parameters, or both, may be associated with respective frequencies that are outside of the uplink sub-band 415-c. In some cases, the first set of one or more frequency hopping parameters and the second set of one or more frequency hopping parameters may be the same or different. Additionally, the first set of one or more frequency hopping parameters, the second set of one or more frequency hopping parameters, or both, may be based on a classification of the slot 410-d (e.g., half-duplex slot 410, SBFD slot 410 with one uplink sub-band 415, SBFD slot 410 with two uplink sub-bands 415). Additionally, or alternatively, a frequency hopping parameter associated with the second RB in the RB set 405-a may be the same as a frequency hopping parameter associated with a second RB in the RB set 405-b (e.g., the UE 115 applies a same RB offset on each RB set 405 on a cyclic manner around a minimum quantity of RBs in an uplink BWP and an uplink sub-band 415). That is, the UE 115 may hop from a first RB in the RB set 405-a to a second RB in the RB set 405-a and hop from a first RB in the RB set 405-b to a second RB in the RB set 405-b according to the following Equation 4:

$$RB_{start} = RB_{start} + RB_{Offset} \bmod(\min(N_{BWP}, N_{UL_{Sub-band}})) \quad (4)$$

where the parameter $RB_{Start}$ may represent a first frequency hopping parameter of the first set of one or more frequency hopping parameters for the RB set 405-a or a first frequency hopping parameter of the second set of one or more frequency hopping parameters for the RB set 405-b, the parameter $RB_{Offset}$ may represent a second frequency hopping parameter of the first set of one or more frequency hopping parameters for the RB set 405-a and a second frequency hopping parameter of the second set of one or more frequency hopping parameters for the RB set 405-b, the parameter $N_{BWP}$ may represent a quantity of RBs in an uplink BWP associated with the slot 410-d, and the parameter $N_{UL_{Sub-band}}$ may represent a quantity of RBs in the uplink sub-band 415-d.

While much of the present disclosure is described in the context of a slot 410 including two downlink sub-bands 420 separated by an uplink sub-band 415, this is not to be regarded as a limitation of the present disclosure. In this regard, a slot 410 allocated for uplink transmissions and downlink transmissions may include any quantity of uplink sub-bands 415 and any quantity of downlink sub-bands 420.

Figure 5:
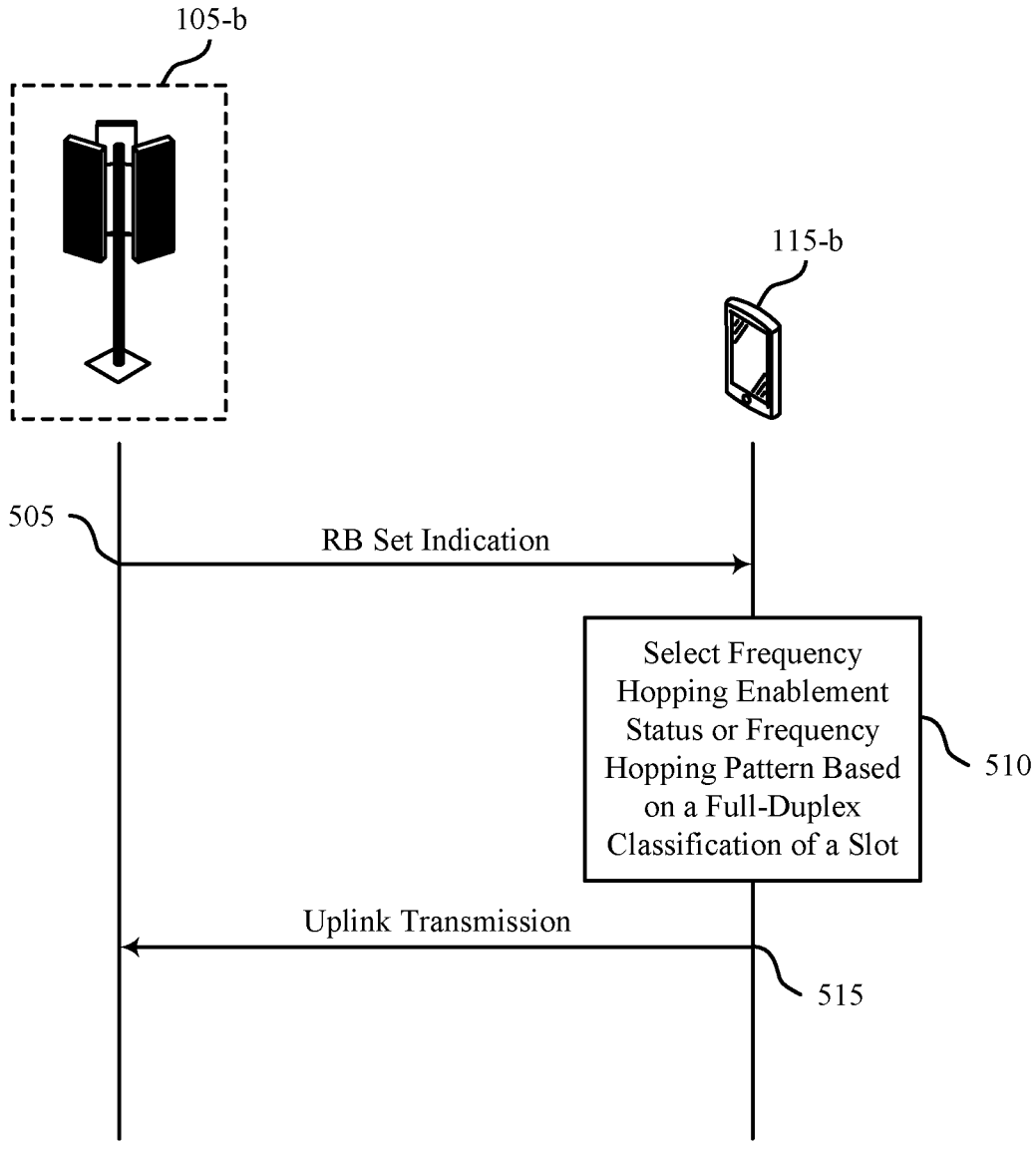
FIG. 5 illustrates an example of a process flow that supports frequency hopping in full-duplex communications in accordance with one or more aspects of the present disclosure.

FIG. 5 illustrates an example of a process flow 500 that supports frequency hopping in full-duplex communications in accordance with one or more aspects of the present disclosure. In some examples, the process flow 500 may implement or be implemented by aspects of the wireless communications system 100, the wireless communications system 200, the SBFD communication schemes 300, and the SBFD communication schemes 400. For example, the process flow 500 may include one or more network entities 105 (e.g., a network entity 105-b) and one or more UEs 115 (e.g., a UE 115-b), which may be examples of the corresponding devices described with reference to FIG. 1. In the example of FIG. 5, the network entity 105 a may be examples of a CU 160, a DU 165, an RU 170, a base station 140, an IAB node 104, or one or more other network nodes as described with reference to FIG. 1. For example, the UE 115-b may select a frequency hopping enablement status of a frequency hopping pattern for a first RB set of one or more RB sets over which the UE is to perform one or more uplink transmissions during a slot, where the slot is associated with a full-duplex classification.

At 505, the network entity 105-b may transmit, to the UE 115-b, an indication of a set of one or more RB sets over which the UE 115-b is to perform one or more uplink transmissions during a slot, which may be an SBFD slot. In some cases, each RB set of the one or more RB sets may be associated with a set of one or more frequency hopping parameters. For example, a first RB set of the one or more RB sets may be associated with a first set of one or more frequency hopping parameters and a second RB set of the one or more RB sets may be associated with a second set of one or more frequency hopping parameters.

In some cases, the one or more uplink transmissions may be associated with a PUSCH. In such cases, a first frequency hopping parameter of the first set of frequency hopping parameters may define a first RB of the first RB set and a second frequency hopping parameter of the first set of frequency hopping parameters may define a second RB of the first RB set. Alternatively, the one or more uplink messages may be associated with a PUCCH. In such cases, the first frequency hopping parameter of the first set of frequency hopping parameters may define the first RB of the first RB set and a second frequency hopping parameter of the first set of frequency hopping parameters may define an offset from the first frequency hopping parameter.

At 510, the UE 115-b may select, for the first RB set of the one or more RB sets, a frequency hopping enablement status or a frequency hopping pattern based on a full-duplex classification of the slot and the first set of one or more frequency hopping parameters associated with the first resource block set. In some cases, the full-duplex classification of the slot may be based on the slot being an SBFD slot.

In some cases, the UE 115-b may disable frequency hopping for the first RB set based on the full-duplex classification of the slot. In some cases, the UE 115-b may disable frequency hopping based on a control message (e.g., RRC message) indicating a frequency hopping disablement rule. That is, the network entity 105-b may transmit, to the UE 115-b, the frequency hopping disablement rule that indicates for the UE 115-b to disable frequency hopping for slots associated with a full-duplex classification (e.g., SBFD slots).

In some other cases, the UE 115-b may select a first frequency hopping pattern associated with a first sub-band in the slot based on the full-duplex classification of the slot, where the first sub-band is based at least in part on a first RB of the first RB set within the slot.

In some other cases, the UE 115-b may select a second frequency hopping pattern associated with a set of sub-bands in the slot based on the full-duplex classification of the slot, where the set of sub-bands includes the first sub-band and a second sub-band.

Additionally, or alternatively, the UE 115-b may select, for the second RB set of the one or more resource block sets, a frequency hopping enablement status or a frequency hopping pattern based at least in part on the full-duplex classification of the slot and the second set of one or more frequency hopping parameters for the second RB set. In some cases, the UE 115-b may enable frequency hopping for the second RB set of the one or more RB sets and select the frequency hopping pattern based on the aforementioned process associated with the first RB set of the one or more RB sets. Alternatively, the UE 115-b may disable frequency hopping for the second RB set of the one or more RB sets based at least in part on the second set of one or more frequency hopping parameters associated with the second RB set. That is, the UE 115-b may disable frequency hopping for the second RB set based on at least one frequency hopping parameters of the second set of one or more frequency hopping parameters for the second RB set being associated with a frequency that is outside of the first sub-band in the slot and the second sub-band in the slot.

At 515, the UE 115-*b* may perform (e.g., transmit) the one or more uplink transmissions during the slot over the one or more RB sets in accordance with the selected frequency hopping enablement status or the selected frequency hopping pattern.

Figure 6:
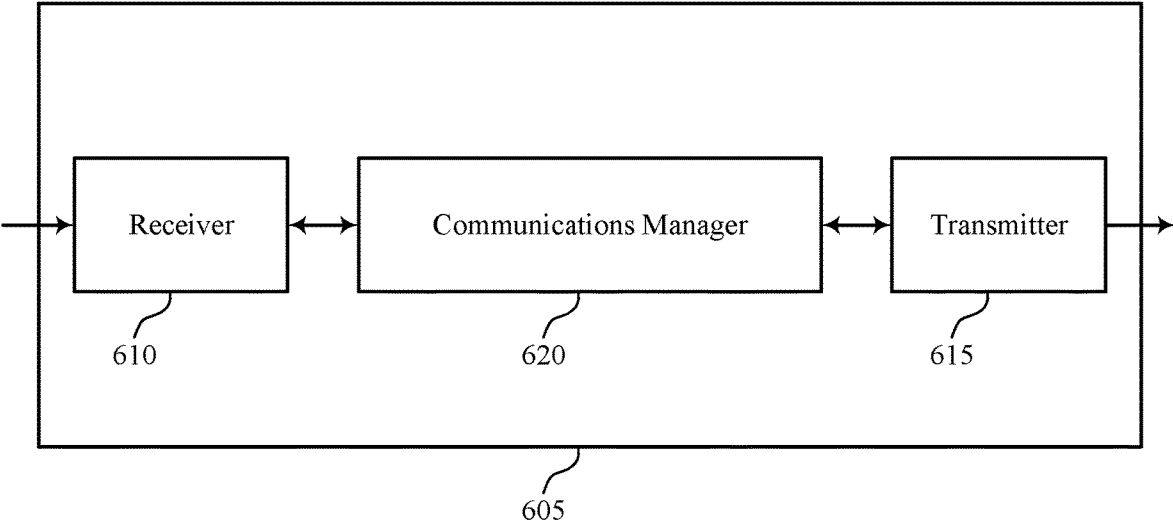
FIGS. 6 and 7 show block diagrams of devices that support frequency hopping in full-duplex communications in accordance with one or more aspects of the present disclosure.

FIG. 6 shows a block diagram 600 of a device 605 that supports frequency hopping in full-duplex communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to frequency hopping in full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to frequency hopping in full-duplex communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of frequency hopping in full-duplex communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving an indication of a set of one or more RB sets over which the UE is to perform one or more uplink transmissions during a slot, where each RB set of the one or more RB sets is associated with a set of one or more frequency hopping parameters. The communications manager 620 may be configured as or otherwise support a means for selecting, for a first RB set of the one or more RB sets, a frequency hopping enablement status or a frequency hopping pattern based at least in part on a full-duplex classification of the slot and the set of one or more frequency hopping parameters for the first RB set. The communications manager 620 may be configured as or otherwise support a means for performing the one or more uplink transmissions during the slot over the one or more RB sets in accordance with the selected frequency hopping enablement status or the selected frequency hopping pattern.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for frequency hopping in full-duplex communications which may result in reduced processing, reduced power consumption, and more efficient utilization of communication resources, among other advantages.

Figure 7:
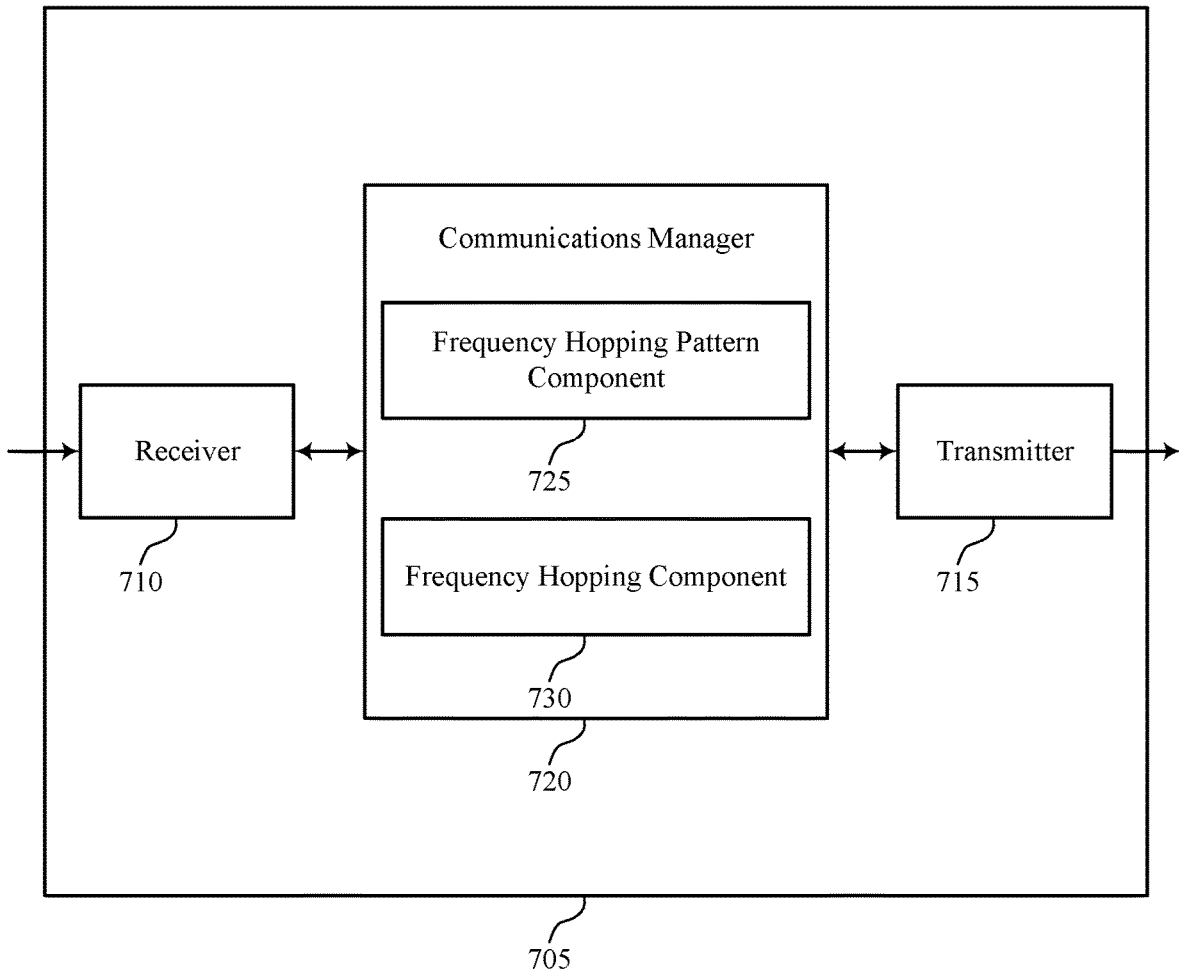

FIG. 7 shows a block diagram 700 of a device 705 that supports frequency hopping in full-duplex communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to frequency hopping in full-duplex communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to frequency hopping in full-duplex communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of frequency hopping in full-duplex communications as described herein. For example, the communications manager 720 may include a frequency hopping pattern component 725 a frequency hopping component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The frequency hopping pattern component 725 may be configured as or otherwise support a means for receiving an indication of a set of one or more RB sets over which the UE is to perform one or more uplink transmissions during a slot, where each RB set of the one or more RB sets is associated with a set of one or more frequency hopping parameters. The frequency hopping component 730 may be configured as or otherwise support a means for selecting, for a first RB set of the one or more RB sets, a frequency hopping enablement status or a frequency hopping pattern based at least in part on a full-duplex classification of the slot and the set of one or more frequency hopping parameters for the first RB set. The frequency hopping component 730 may be configured as or otherwise support a means for performing the one or more uplink transmissions during the slot over the one or more RB sets in accordance with the selected frequency hopping enablement status or the selected frequency hopping pattern.

Figure 8:
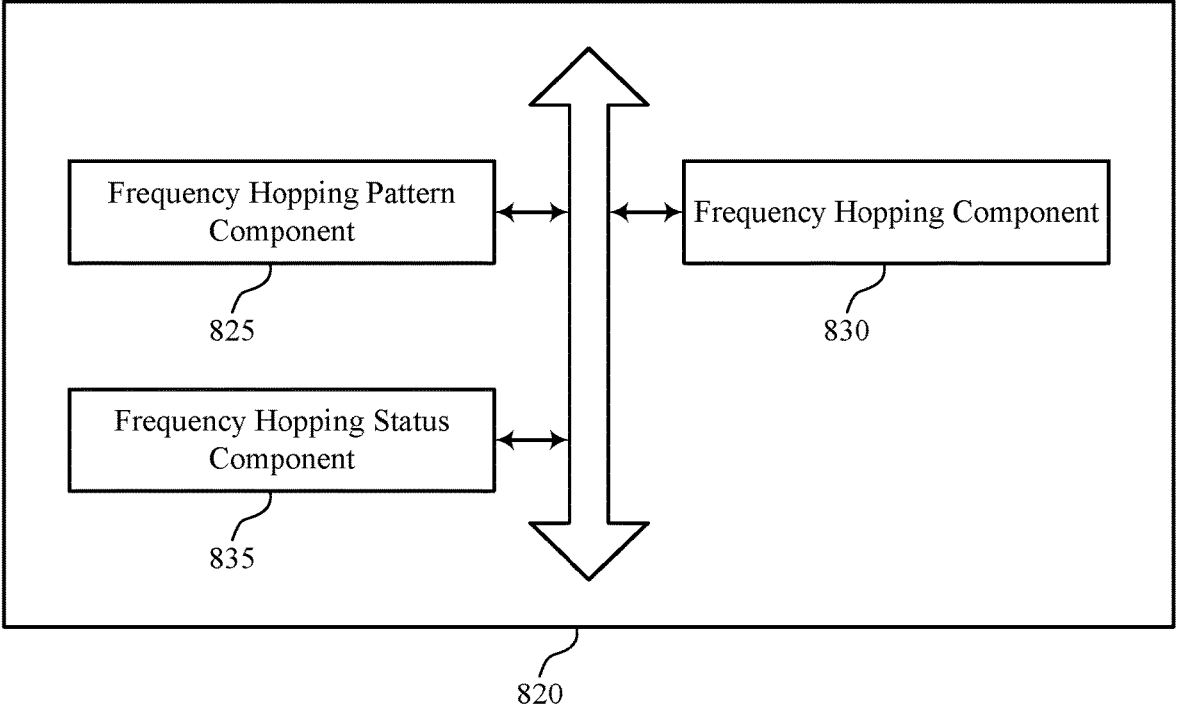
FIG. 8 shows a block diagram of a communications manager that supports frequency hopping in full-duplex communications in accordance with one or more aspects of the present disclosure.

FIG. 8 shows a block diagram 800 of a communications manager 820 that supports frequency hopping in full-duplex communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of frequency hopping in full-duplex communications as described herein. For example, the communications manager 820 may include a frequency hopping pattern component 825, a frequency hopping component 830, a frequency hopping enablement status component 835, or any combination thereof. Each of these components may communicate, directly or indirectly, with one another (e.g., via one or more buses).

The communications manager 820 may support wireless communications at a UE in accordance with examples as disclosed herein. The frequency hopping pattern component 825 may be configured as or otherwise support a means for receiving an indication of a set of one or more RB sets over which the UE is to perform one or more uplink transmissions during a slot, where each RB set of the one or more RB sets is associated with a set of one or more frequency hopping parameters. The frequency hopping component 830 may be configured as or otherwise support a means for selecting, for a first RB set of the one or more RB sets, a frequency hopping enablement status or a frequency hopping pattern based at least in part on a full-duplex classification of the slot and the set of one or more frequency hopping parameters for the first RB set. In some examples, the frequency hopping component 830 may be configured as or otherwise support a means for performing the one or more uplink transmissions during the slot over the one or more RB sets in accordance with the selected frequency hopping enablement status or the selected frequency hopping pattern.

In some examples, to support selecting the frequency hopping enablement status, the frequency hopping enablement status component 835 may be configured as or otherwise support a means for disabling frequency hopping for the first RB set based at least in part on the full-duplex classification of the slot.

In some examples, the frequency hopping enablement status component 835 may be configured as or otherwise support a means for receiving control signaling indicating a frequency hopping disablement rule associated with the full-duplex classification of the slot, where disabling frequency hopping is based at least in part on the control signaling.

In some examples, to support selecting the frequency hopping pattern, the frequency hopping pattern component 825 may be configured as or otherwise support a means for selecting a first frequency hopping pattern associated with a first sub-band in the slot based at least in part on the full-duplex classification of the slot, where the first sub-band is based at least in part on a first RB of the first RB set within the slot, where a first frequency hopping parameter of the set of one or more frequency hopping parameters for the first RB set defines the first RB.

In some examples, to support performing the one or more uplink transmissions during the slot over the one or more RB sets in accordance with the selected frequency hopping pattern, the frequency hopping component 830 may be configured as or otherwise support a means for hopping from the first RB of the first RB set to a second RB of the first RB set within the slot, where the second RB is selected based at least in part on a second frequency hopping parameter of the set of one or more frequency hopping parameters for the first RB set, and the second RB is specific to the first sub-band.

In some examples, to support performing the one or more uplink transmissions during the slot over the one or more RB sets in accordance with the selected frequency hopping pattern, the frequency hopping component 830 may be configured as or otherwise support a means for hopping from the first RB of the first RB set to a second RB of the first RB set within the slot, based at least in part on a second frequency hopping parameter of the set of one or more frequency hopping parameters for the first RB set, the first frequency hopping parameter of the set of one or more frequency hopping parameters for the first RB set, and a quantity of RBs in the first sub-band.

In some examples, to support selecting the first frequency hopping pattern, the frequency hopping pattern component 825 may be configured as or otherwise support a means for selecting the first frequency hopping pattern associated with a set of sub-bands in the slot based at least in part on the full-duplex classification of the slot, where the set of sub-bands includes the first sub-band and a second sub-band.

In some examples, to support performing the one or more uplink transmissions during the slot over the one or more RB sets in accordance with the selected frequency hopping pattern, the frequency hopping component 830 may be configured as or otherwise support a means for dropping transmission of the first RB of the first RB set of the one or more RB sets based at least in part on the first frequency hopping parameter of the set of one or more frequency hopping parameters for the first RB set being associated with a frequency that is outside of the first sub-band and the second sub-band.

In some examples, to support performing the one or more uplink transmissions during the slot over the one or more RB sets in accordance with the selected frequency hopping pattern, the frequency hopping component 830 may be configured as or otherwise support a means for hopping from the first RB of the first RB set to a second RB of the first RB set within the slot based at least in part on a second frequency hopping parameter of the set of one or more frequency hopping parameters for the first RB set, and the second RB is specific to the second sub-band.

In some examples, to support performing the one or more uplink transmissions during the slot over the one or more RB sets in accordance with the selected frequency hopping pattern, the frequency hopping component 830 may be configured as or otherwise support a means for hopping from the first RB of the first RB set to a second RB of the first RB within the slot set based at least in part on a second frequency hopping parameter of the set of one or more frequency hopping parameters for the first RB set, the first frequency hopping parameter of the set of one or more frequency hopping parameters for the first RB set, a quantity of RBs in the first sub-band, a quantity of resources in the second sub-band, and a quantity of resources in a third sub-band.

In some examples, the one or more uplink transmissions are associated with a physical uplink control channel. In some examples, a second frequency hopping parameter of the set of one or more frequency hopping parameters for the first RB set defines a second RB of the first RB set.

In some examples, the one or more uplink transmissions are associated with a physical uplink shared channel. In some examples, a second frequency hop parameter of the set of one or more frequency hopping parameters for the first RB set defines an offset from the first frequency hopping parameter.

In some examples, the frequency hopping component 830 may be configured as or otherwise support a means for selecting, for a second RB set of the one or more RB sets, a frequency hopping enablement status or a frequency hopping pattern based at least in part on the full-duplex classification of the slot and the set of one or more frequency hopping parameters for the second RB set.

In some examples, to support selecting the frequency hopping enablement status, the frequency hopping enablement status component 835 may be configured as or otherwise support a means for disabling frequency hopping for the second RB set of the one or more RB sets based at least in part on the set of one or more frequency hopping parameters associated with the second RB set, where at least one frequency hopping parameters of the set of one or more frequency hopping parameters for the second RB set is associated with a frequency that is outside of a first sub-band in the slot and a second sub-band in the slot.

In some examples, the frequency hopping pattern component 825 may be configured as or otherwise support a means for receiving control signaling indicating the set of one or more frequency hopping parameters associated with each RB set of the one or more RB sets.

In some examples, the slot is a sub-band full-duplex slot. In some examples, the full-duplex classification is based at least in part on the sub-band full-duplex slot.

Figure 9:
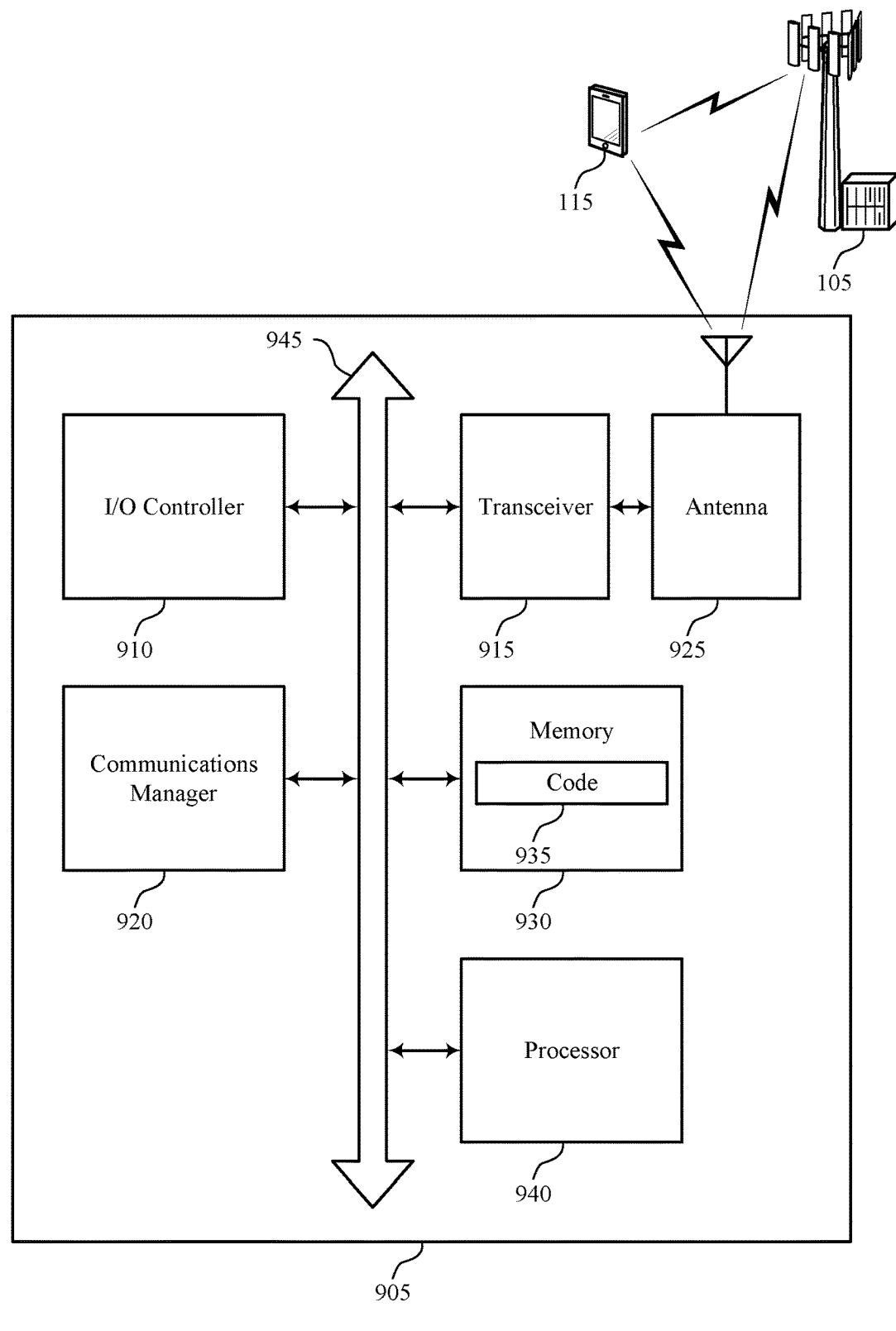
FIG. 9 shows a diagram of a system including a device that supports frequency hopping in full-duplex communications in accordance with one or more aspects of the present disclosure.

FIG. 9 shows a diagram of a system 900 including a device 905 that supports frequency hopping in full-duplex communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting frequency hopping in full-duplex communications). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving an indication of a set of one or more RB sets over which the UE is to perform one or more uplink transmissions during a slot, where each RB set of the one or more RB sets is associated with a set of one or more frequency hopping parameters. The communications manager 920 may be configured as or otherwise support a means for selecting, for a first RB set of the one or more RB sets, a frequency hopping enablement status or a frequency hopping pattern based at least in part on a full-duplex classification of the slot and the set of one or more frequency hopping parameters for the first RB set. The communications manager 920 may be configured as or otherwise support a means for performing the one or more uplink transmissions during the slot over the one or more RB sets in accordance with the selected frequency hopping enablement status or the selected frequency hopping pattern.

By including or configuring the communications manager 920 in accordance with examples as described herein, the device 905 may support techniques for frequency hopping in full-duplex communications which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of frequency hopping in full-duplex communications as described herein, or the processor 940 and the memory 930 may be otherwise configured to perform or support such operations.

Figure 10:
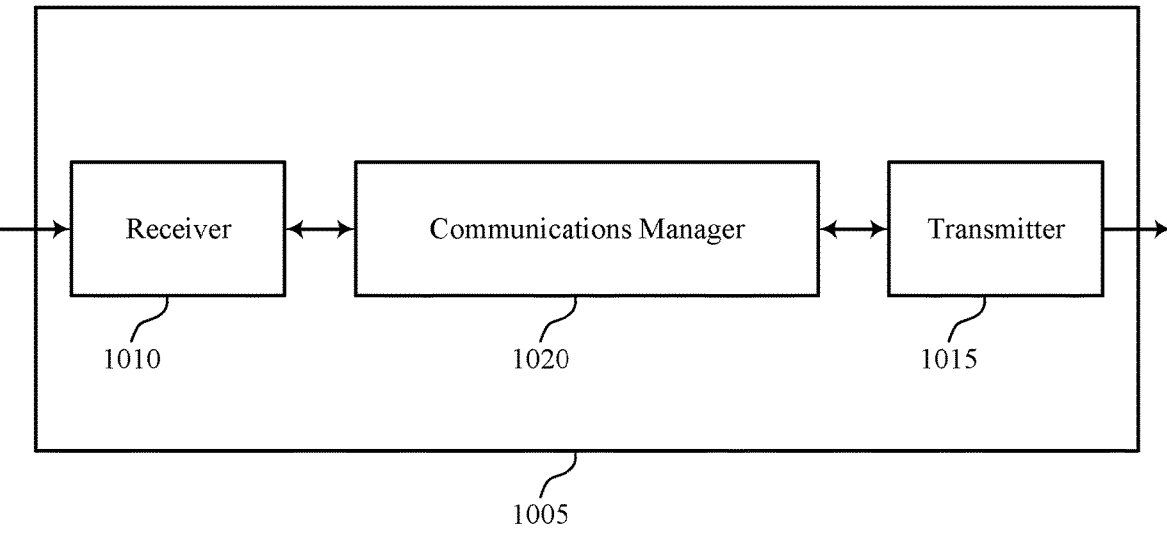
FIGS. 10 and 11 show block diagrams of devices that support frequency hopping in full-duplex communications in accordance with one or more aspects of the present disclosure.

FIG. 10 shows a block diagram 1000 of a device 1005 that supports frequency hopping in full-duplex communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of frequency hopping in full-duplex communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting an indication of a set of one or more RB sets over which a UE is to perform one or more uplink transmissions during a slot, where each RB set of the one or more RB sets is associated with a set of one or more frequency hopping parameters and where the slot is associated with a full-duplex classification. The communications manager 1020 may be configured as or otherwise support a means for obtaining the one or more uplink transmissions during the slot over the one or more RB sets in accordance with a frequency hopping pattern.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for frequency hopping in full-duplex communications which may result in reduced processing, reduced power consumption, and more efficient utilization of communication resources, among other advantages.

Figure 11:
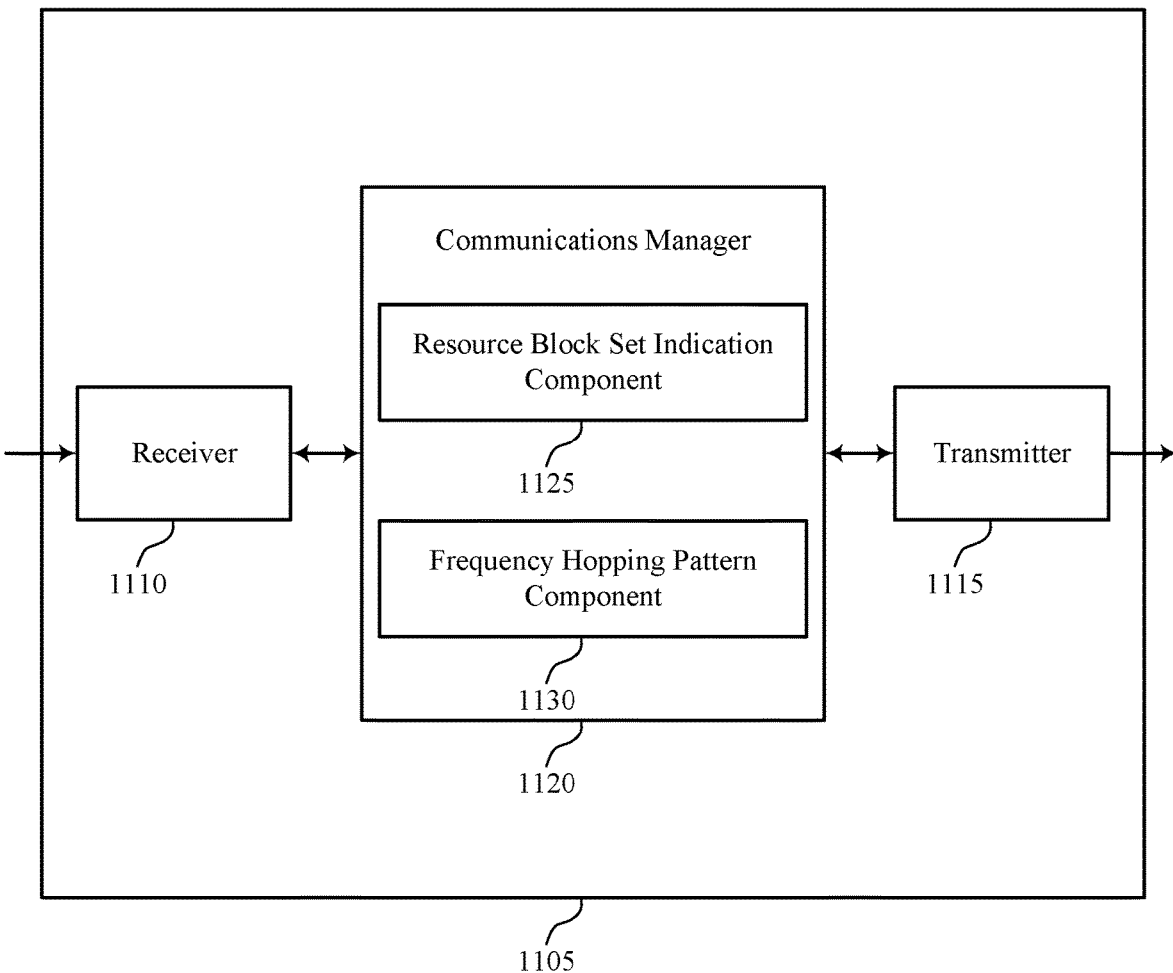

FIG. 11 shows a block diagram 1100 of a device 1105 that supports frequency hopping in full-duplex communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of frequency hopping in full-duplex communications as described herein. For example, the communications manager 1120 may include a RB set indication component 1125 a frequency hopping pattern component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The RB set indication component 1125 may be configured as or otherwise support a means for outputting an indication of a set of one or more RB sets over which a UE is to perform one or more uplink transmissions during a slot, where each RB set of the one or more RB sets is associated with a set of one or more frequency hopping parameters and where the slot is associated with a full-duplex classification. The frequency hopping pattern component 1130 may be configured as or otherwise support a means for obtaining the one or more uplink transmissions during the slot over the one or more RB sets in accordance with a frequency hopping pattern.

Figure 12:
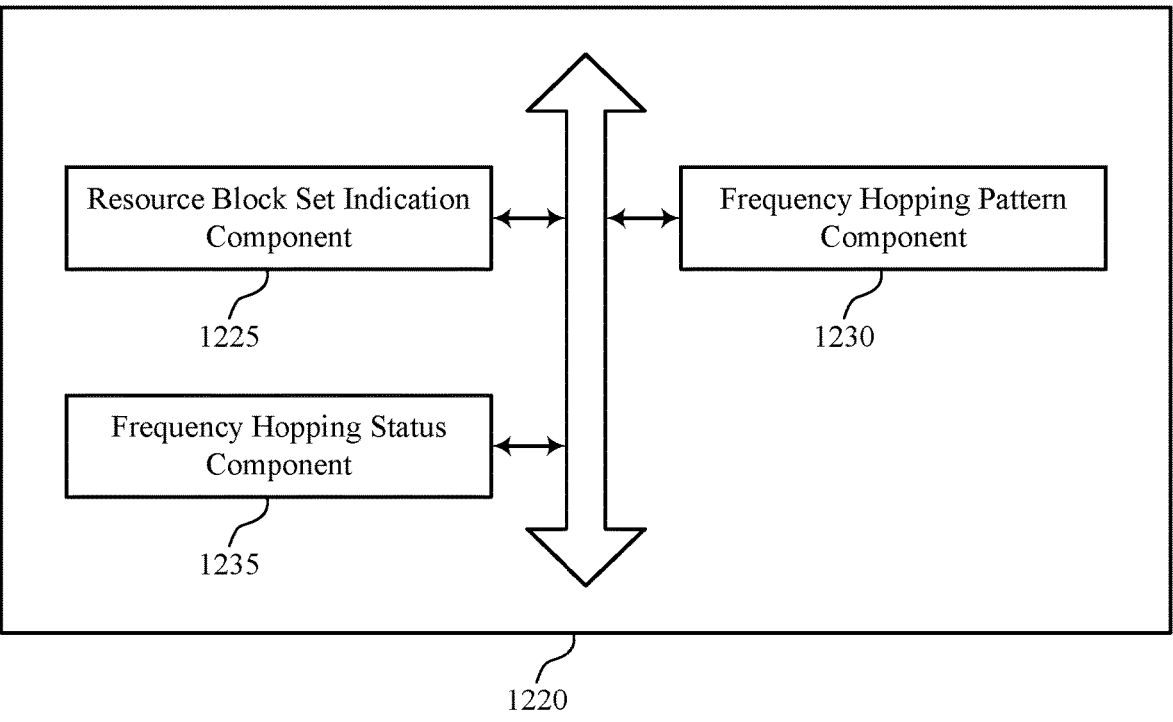
FIG. 12 shows a block diagram of a communications manager that supports frequency hopping in full-duplex communications in accordance with one or more aspects of the present disclosure.
Figure 12:

FIG. 12 shows a block diagram 1200 of a communications manager 1220 that supports frequency hopping in full-duplex communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of frequency hopping in full-duplex communications as described herein. For example, the communications manager 1220 may include a RB set indication component 1225, a frequency hopping pattern component 1230, a frequency hopping enablement status component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The RB set indication component 1225 may be configured as or otherwise support a means for outputting an indication of a set of one or more RB sets over which a UE is to perform one or more uplink transmissions during a slot, where each RB set of the one or more RB sets is associated with a set of one or more frequency hopping parameters and where the slot is associated with a full-duplex classification. The frequency hopping pattern component 1230 may be configured as or otherwise support a means for obtaining the one or more uplink transmissions during the slot over the one or more RB sets in accordance with a frequency hopping pattern.

In some examples, the frequency hopping enablement status component 1235 may be configured as or otherwise support a means for outputting control signaling indicating a frequency hopping enablement status disabling frequency hopping based at least in part on the full-duplex classification of the slot, where disabling frequency hopping is based at least in part on the control signaling.

In some examples, the frequency hopping pattern component 1230 may be configured as or otherwise support a means for outputting control signaling indicating the set of one or more frequency hopping parameter associated with each RB set of the one or more RB sets.

In some examples, the one or more uplink transmissions are associated with a physical uplink control channel, and where the set of one or more parameters associated with each RB set of the one or more RB sets includes a first frequency hop parameter associated with a first RB of a respective RB set and a second frequency hop parameter associated with a second RB of the respective RB set.

In some examples, the one or more uplink transmissions are associated with a physical uplink shared channel, and where the set of one or more parameters associated with each RB set of the one or more RB sets includes a first frequency hop parameter associated with a first RB of a respective RB set and a second frequency hop parameter associated with an offset from the first RB.

In some examples, the slot is a sub-band full-duplex slot. In some examples, the full-duplex classification is based at least in part on the sub-band full-duplex slot.

Figure 13:
FIG. 13 shows a diagram of a system including a device that supports frequency hopping in full-duplex communications in accordance with one or more aspects of the present disclosure.

FIG. 13 shows a diagram of a system 1300 including a device 1305 that supports frequency hopping in full-duplex communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based at least in part on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a program-mable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting fre-quency hopping in full-duplex communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the func-tions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or compo-nents of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some imple-mentations, the first interface may refer to an interface between the processing system of the chip or modem and a transmitter, such that the device 1305 may transmit infor-mation output from the chip or modem. In some implemen-tations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communica-tions of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may man-age the transfer of data communications for client devices, such as one or more UEs 115. In some examples, the communications manager 1320 may manage communica-tions with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communi-cation between network entities 105.

The communications manager 1320 may support wireless communications at a network entity in accordance with examples as disclosed herein. For example, the communi-cations manager 1320 may be configured as or otherwise support a means for outputting an indication of a set of one or more RB sets over which a UE is to perform one or more uplink transmissions during a slot, where each RB set of the one or more RB sets is associated with a set of one or more frequency hopping parameters and where the slot is associ-ated with a full-duplex classification. The communications manager 1320 may be configured as or otherwise support a means for obtaining the one or more uplink transmissions during the slot over the one or more RB sets in accordance with a frequency hopping pattern.

By including or configuring the communications manager 1320 in accordance with examples as described herein, the device 1305 may support techniques for frequency hopping in full-duplex communications which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with ref-erence to the communications manager 1320 may be sup-ported by or performed by the processor 1335, the memory 1325, the code 1330, the transceiver 1310, or any combi-nation thereof. For example, the code 1330 may include instructions executable by the processor 1335 to cause the device 1305 to perform various aspects of frequency hop-ping in full-duplex communications as described herein, or the processor 1335 and the memory 1325 may be otherwise configured to perform or support such operations.

FIG. 14 shows a flowchart illustrating a method 1400 that supports frequency hopping in full-duplex communications in accordance with one or more aspects of the present disclosure. The operations of the method 1400 may be implemented by a UE or its components as described herein.

For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a set of one or more RB sets over which the UE is to perform one or more uplink transmissions during a slot, where each RB set of the one or more RB sets is associated with a set of one or more frequency hopping parameters. The operations of 1405 may be performed in accordance with examples as disclosed herein. In some examples, aspects of the operations of 1405 may be performed by a frequency hopping pattern component 825 as described with reference to FIG. 8.

At 1410, the method may include selecting, for a first RB set of the one or more RB sets, a frequency hopping enablement status or a frequency hopping pattern based at least in part on a full-duplex classification of the slot and the set of one or more frequency hopping parameters for the first RB set. The operations of 1410 may be performed in accordance with examples as disclosed herein. In some examples, aspects of the operations of 1410 may be performed by a frequency hopping component 830 as described with reference to FIG. 8.

At 1415, the method may include performing the one or more uplink transmissions during the slot over the one or more RB sets in accordance with the selected frequency hopping enablement status or the selected frequency hopping pattern. The operations of 1415 may be performed in accordance with examples as disclosed herein. In some examples, aspects of the operations of 1415 may be performed by a frequency hopping component 830 as described with reference to FIG. 8.

FIG. 15 shows a flowchart illustrating a method 1500 that supports frequency hopping in full-duplex communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a set of one or more RB sets over which the UE is to perform one or more uplink transmissions during a slot, where each RB set of the one or more RB sets is associated with a set of one or more frequency hopping parameters. The operations of 1505 may be performed in accordance with examples as disclosed herein. In some examples, aspects of the operations of 1505 may be performed by a frequency hopping pattern component 825 as described with reference to FIG. 8.

At 1510, the method may include selecting, for a first RB set of the one or more RB sets, a frequency hopping enablement status or a frequency hopping pattern based at least in part on a full-duplex classification of the slot and the set of one or more frequency hopping parameters for the first RB set. The operations of 1510 may be performed in accordance with examples as disclosed herein. In some examples, aspects of the operations of 1510 may be performed by a frequency hopping component 830 as described with reference to FIG. 8.

At 1515, the method may include selecting a first frequency hopping pattern associated with a first sub-band in the slot based at least in part on the full-duplex classification of the slot, where the first sub-band is based at least in part on a first RB of the first RB set within the slot, where a first frequency hopping parameter of the set of one or more frequency hopping parameters for the first RB set defines the first RB. The operations of 1515 may be performed in accordance with examples as disclosed herein. In some examples, aspects of the operations of 1515 may be performed by a frequency hopping pattern component 825 as described with reference to FIG. 8.

At 1520, the method may include performing the one or more uplink transmissions during the slot over the one or more RB sets in accordance with the selected frequency hopping enablement status or the selected frequency hopping pattern. The operations of 1520 may be performed in accordance with examples as disclosed herein. In some examples, aspects of the operations of 1520 may be performed by a frequency hopping component 830 as described with reference to FIG. 8.

FIG. 16 shows a flowchart illustrating a method 1600 that supports frequency hopping in full-duplex communications in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving an indication of a set of one or more RB sets over which the UE is to perform one or more uplink transmissions during a slot, where each RB set of the one or more RB sets is associated with a set of one or more frequency hopping parameters. The operations of 1605 may be performed in accordance with examples as disclosed herein. In some examples, aspects of the operations of 1605 may be performed by a frequency hopping pattern component 825 as described with reference to FIG. 8.

At 1610, the method may include selecting, for a first RB set of the one or more RB sets, a frequency hopping enablement status or a frequency hopping pattern based at least in part on a full-duplex classification of the slot and the set of one or more frequency hopping parameters for the first RB set. The operations of 1610 may be performed in accordance with examples as disclosed herein. In some examples, aspects of the operations of 1610 may be performed by a frequency hopping component 830 as described with reference to FIG. 8.

At 1615, the method may include selecting, for a second RB set of the one or more RB sets, a frequency hopping enablement status or a frequency hopping pattern based at least in part on the full-duplex classification of the slot and the set of one or more frequency hopping parameters for the second RB set. The operations of 1615 may be performed in accordance with examples as disclosed herein. In some examples, aspects of the operations of 1615 may be performed by a frequency hopping component 830 as described with reference to FIG. 8.

At 1620, the method may include performing the one or more uplink transmissions during the slot over the one or more RB sets in accordance with the selected frequency hopping enablement status or the selected frequency hopping pattern. The operations of 1620 may be performed in accordance with examples as disclosed herein. In some examples, aspects of the operations of 1620 may be performed by a frequency hopping component 830 as described with reference to FIG. 8.

FIG. 17 shows a flowchart illustrating a method 1700 that supports frequency hopping in full-duplex communications in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting an indication of a set of one or more RB sets over which a UE is to perform one or more uplink transmissions during a slot, where each RB set of the one or more RB sets is associated with a set of one or more frequency hopping parameters and where the slot is associated with a full-duplex classification. The operations of 1705 may be performed in accordance with examples as disclosed herein. In some examples, aspects of the operations of 1705 may be performed by a RB set indication component 1225 as described with reference to FIG. 12.

At 1710, the method may include obtaining the one or more uplink transmissions during the slot over the one or more RB sets in accordance with a frequency hopping pattern. The operations of 1710 may be performed in accordance with examples as disclosed herein. In some examples, aspects of the operations of 1710 may be performed by a frequency hopping pattern component 1230 as described with reference to FIG. 12.

The following provides an overview of aspects of the present disclosure:

Aspect 1: A method for wireless communications at a UE, comprising: receiving an indication of a set of one or more RB sets over which the UE is to perform one or more uplink transmissions during a slot, wherein each RB set of the one or more RB sets is associated with a set of one or more frequency hopping parameters; selecting, for a first RB set of the one or more RB sets, a frequency hopping enablement status or a frequency hopping pattern based at least in part on a full duplex classification of the slot and the set of one or more frequency hopping parameters for the first RB set; and performing the one or more uplink transmissions during the slot over the one or more RB sets in accordance with the selected frequency hopping enablement status or the selected frequency hopping pattern.

Aspect 2: The method of aspect 1, wherein selecting the frequency hopping enablement status comprises: disabling frequency hopping for the first RB set based at least in part on the full duplex classification of the slot.

Aspect 3: The method of aspect 2, further comprising: receiving control signaling indicating a frequency hopping disablement rule associated with the full-duplex classification of the slot, wherein disabling frequency hopping is based at least in part on the control signaling.

Aspect 4: The method of aspect 1, wherein selecting the frequency hopping pattern comprises: selecting a first frequency hopping pattern associated with a first sub-band in the slot based at least in part on the full duplex classification of the slot, wherein the first sub-band is based at least in part on a first RB of the first RB set within the slot, wherein a first frequency hopping parameter of the set of one or more frequency hopping parameters for the first RB set defines the first RB.

Aspect 5: The method of aspect 4, wherein performing the one or more uplink transmissions during the slot over the one or more RB sets in accordance with the selected frequency hopping pattern comprises: hopping from the first RB of the first RB set to a second RB of the first RB set within the slot, wherein the second RB is selected based at least in part on a second frequency hopping parameter of the set of one or more frequency hopping parameters for the first RB set, and the second RB is specific to the first sub-band.

Aspect 6: The method of any of aspects 4 through 5, wherein performing the one or more uplink transmissions during the slot over the one or more RB sets in accordance with the selected frequency hopping pattern comprises: hopping from the first RB of the first RB set to a second RB of the first RB set within the slot, based at least in part on a second frequency hopping parameter of the set of one or more frequency hopping parameters for the first RB set, the first frequency hopping parameter of the set of one or more frequency hopping parameters for the first RB set, and a quantity of RBs in the first sub-band.

Aspect 7: The method of aspect 4, wherein selecting the first frequency hopping pattern comprises: selecting the first frequency hopping pattern associated with a set of sub-bands in the slot based at least in part on the full duplex classification of the slot, wherein the set of sub-bands comprises the first sub-band and a second sub-band.

Aspect 8: The method of aspect 7, wherein performing the one or more uplink transmissions during the slot over the one or more RB sets in accordance with the selected frequency hopping pattern comprises: dropping transmission of the first RB of the first RB set of the one or more RB sets based at least in part on the first frequency hopping parameter of the set of one or more frequency hopping parameters for the first RB set being associated with a frequency that is outside of the first sub-band and the second sub-band.

Aspect 9: The method of any of aspects 7 through 8, wherein performing the one or more uplink transmissions during the slot over the one or more RB sets in accordance with the selected frequency hopping pattern comprises: hopping from the first RB of the first RB set to a second RB of the first RB set within the slot based at least in part on a second frequency hopping parameter of the set of one or more frequency hopping parameters for the first RB set, and the second RB is specific to the second sub-band.

Aspect 10: The method of any of aspects 7 through 8, wherein performing the one or more uplink transmissions during the slot over the one or more RB sets in accordance with the selected frequency hopping pattern comprises: hopping from the first RB of the first RB set to a second RB of the first RB within the slot set based at least in part on a second frequency hopping parameter of the set of one or more frequency hopping parameters for the first RB set, the first frequency hopping parameter of the set of one or more frequency hopping parameters for the first RB set, a quantity of RBs in the first sub-band, a quantity of resources in the second sub-band, and a quantity of resources in a third sub-band.

Aspect 11: The method of any of aspects 4 through 10, wherein the one or more uplink transmissions are associated with a physical uplink control channel, and a second frequency hopping parameter of the set of one or more frequency hopping parameters for the first RB set defines a second RB of the first RB set.

Aspect 12: The method of any of aspects 4 through 11, wherein the one or more uplink transmissions are associated with a physical uplink shared channel, and a second frequency hop parameter of the set of one or more frequency hopping parameters for the first RB set defines an offset from the first frequency hopping parameter.

Aspect 13: The method of any of aspects 1 through 12, further comprising: selecting, for a second RB set of the one or more RB sets, a frequency hopping enablement status or a frequency hopping pattern based at least in part on the full duplex classification of the slot and the set of one or more frequency hopping parameters for the second RB set.

Aspect 14: The method of aspect 13, wherein selecting the frequency hopping enablement status comprises: disabling frequency hopping for the second RB set of the one or more RB sets based at least in part on the set of one or more frequency hopping parameters associated with the second RB set, wherein at least one frequency hopping parameters of the set of one or more frequency hopping parameters for the second RB set is associated with a frequency that is outside of a first sub-band in the slot and a second sub-band in the slot.

Aspect 15: The method of any of aspects 1 through 14, further comprising: receiving control signaling indicating the set of one or more frequency hopping parameters associated with each RB set of the one or more RB sets.

Aspect 16: The method of any of aspects 1 through 15, wherein the slot is a SBFD slot, and the full duplex classification is based at least in part on the SBFD slot.

Aspect 17: A method for wireless communications at a network entity, comprising: outputting an indication of a set of one or more RB sets over which a UE is to perform one or more uplink transmissions during a slot, wherein each RB set of the one or more RB sets is associated with a set of one or more frequency hopping parameters and wherein the slot is associated with a full duplex classification; and obtaining the one or more uplink transmissions during the slot over the one or more RB sets in accordance with a frequency hopping pattern.

Aspect 18: The method of aspect 17, further comprising: outputting control signaling indicating a frequency hopping enablement status disabling frequency hopping based at least in part on the full-duplex classification of the slot, wherein disabling frequency hopping is based at least in part on the control signaling.

Aspect 19: The method of any of aspects 17 through 18, further comprising: outputting control signaling indicating the set of one or more frequency hopping parameter associated with each RB set of the one or more RB sets.

Aspect 20: The method of aspect 19, wherein the one or more uplink transmissions are associated with a physical uplink control channel, and where the set of one or more parameters associated with each RB set of the one or more RB sets comprises a first frequency hop parameter associated with a first RB of a respective RB set and a second frequency hop parameter associated with a second RB of the respective RB set.

Aspect 21: The method of any of aspects 19 through 20, wherein the one or more uplink transmissions are associated with a physical uplink shared channel, and where the set of one or more parameters associated with each RB set of the one or more RB sets comprises a first frequency hop parameter associated with a first RB of a respective RB set and a second frequency hop parameter associated with an offset from the first RB.

Aspect 22: The method of any of aspects 17 through 21, wherein the slot is a SBFD slot, and the full duplex classification is based at least in part on the SBFD slot.

Aspect 23: An apparatus for wireless communications at a UE, comprising at least one processor and memory coupled with the at least one processor, the memory storing instructions executable by the at least one processor to cause the UE to perform a method of any of aspects 1 through 16.

Aspect 24: An apparatus for wireless communications at a UE, comprising at least one means for performing a method of any of aspects 1 through 16.

Aspect 25: A non-transitory computer-readable medium storing code for wireless communications at a UE, the code comprising instructions executable by at least one processor to perform a method of any of aspects 1 through 16.

Aspect 26: An apparatus for wireless communications at a network entity, comprising at least one processor and memory coupled with the at least one processor, the memory storing instructions executable by the at least one processor to cause the network entity to perform a method of any of aspects 17 through 22.

Aspect 27: An apparatus for wireless communications at a network entity, comprising at least one means for performing a method of any of aspects 17 through 22.

Aspect 28: A non-transitory computer-readable medium storing code for wireless communications at a network entity, the code comprising instructions executable by at least one processor to perform a method of any of aspects 17 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor; and one or more memories coupled to the at least one processor, the one or more memories storing instructions executable by the at least one processor, directly or after compilation, to cause the UE to:

receive an indication of a plurality of resource block sets over which the UE is to perform one or more uplink transmissions during a slot associated with a full-duplex classification, wherein each resource block set of the plurality of resource block sets is associated with the slot and is associated with a different plurality of frequency hopping parameters for performing frequency hopping within the slot;

select, for a first resource block set of the plurality of resource block sets, a frequency hopping enablement status or a frequency hopping pattern based at least in part on the full-duplex classification of the slot and a first plurality of frequency hopping parameters associated with the first resource block set; and perform the one or more uplink transmissions during the slot over the plurality of resource block sets in accordance with the selected frequency hopping enablement status or the selected frequency hopping pattern.

2. The apparatus of claim 1, wherein the instructions to select the frequency hopping enablement status are executable by the at least one processor, directly or after compilation, to cause the UE to:

disable frequency hopping for the first resource block set based at least in part on the full-duplex classification of the slot.

3. The apparatus of claim 2, wherein the instructions are further executable by the at least one processor, directly or after compilation, to cause the UE to:

receive control signaling indicating a frequency hopping disablement rule associated with the full-duplex classification of the slot, wherein disabling frequency hopping is based at least in part on the control signaling.

4. The apparatus of claim 1, wherein the instructions to select the frequency hopping pattern are executable by the at least one processor, directly or after compilation, to cause the UE to:

select a first frequency hopping pattern associated with a first sub-band in the slot based at least in part on the full-duplex classification of the slot, wherein the first sub-band is based at least in part on a first resource block of the first resource block set within the slot, wherein a first frequency hopping parameter of the first plurality of frequency hopping parameters associated with the first resource block set defines the first resource block.

5. The apparatus of claim 4, wherein the instructions to perform the one or more uplink transmissions during the slot over the plurality of resource block sets in accordance with the selected frequency hopping pattern are executable by the at least one processor, directly or after compilation, to cause the UE to:

hop from the first resource block of the first resource block set to a second resource block of the first resource block set within the slot, wherein the second resource block is selected based at least in part on a second frequency hopping parameter of the first plurality of frequency hopping parameters associated with the first resource block set, and the second resource block is specific to the first sub-band.

6. The apparatus of claim 4, wherein the instructions to perform the one or more uplink transmissions during the slot the plurality of resource block sets in accordance with the selected frequency hopping pattern are executable by the at least one processor, directly or after compilation, to cause the UE to:

hop from the first resource block of the first resource block set to a second resource block of the first resource block set within the slot, based at least in part on a second frequency hopping parameter of the first plurality of frequency hopping parameters associated with the first resource block set, the first frequency hopping parameter of the first plurality of frequency hopping parameters associated with the first resource block set, and a quantity of resource blocks in the first sub-band.

7. The apparatus of claim 4, wherein the instructions to select the first frequency hopping pattern are executable by the at least one processor, directly or after compilation, to cause the UE to:

select the first frequency hopping pattern associated with a set of sub-bands in the slot based at least in part on the full-duplex classification of the slot, wherein the set of sub-bands comprises the first sub-band and a second sub-band.

8. The apparatus of claim 7, wherein the instructions to perform the one or more uplink transmissions during the slot over the plurality of resource block sets in accordance with the selected frequency hopping pattern are executable by the at least one processor, directly or after compilation, to cause the UE to:

drop transmission of the first resource block of the first resource block set of the plurality of resource block sets based at least in part on the first frequency hopping parameter of the first plurality of frequency hopping parameters associated with the first resource block set being associated with a frequency that is outside of the first sub-band and the second sub-band.

9. The apparatus of claim 7, wherein the instructions to perform the one or more uplink transmissions during the slot over the plurality of resource block sets in accordance with the selected frequency hopping pattern are executable by the at least one processor, directly or after compilation, to cause the UE to:

hop from the first resource block of the first resource block set to a second resource block of the first resource block set within the slot based at least in part on a second frequency hopping parameter of the first plurality of frequency hopping parameters associated with the first resource block set, and the second resource block is specific to the second sub-band.

10. The apparatus of claim 7, wherein the instructions to perform the one or more uplink transmissions during the slot over the plurality of resource block sets in accordance with the selected frequency hopping pattern are executable by the at least one processor, directly or after compilation, to cause the UE to:

hop from the first resource block of the first resource block set to a second resource block of the first resource block set within the slot based at least in part on a second frequency hopping parameter of the first plurality of frequency hopping parameters associated with the first resource block set, the first frequency hopping parameter of the first plurality of frequency hopping parameters associated with the first resource block set, a quantity of resource blocks in the first sub-band, a quantity of resources in the second sub-band, and a quantity of resources in a third sub-band.

11. The apparatus of claim 4, wherein the one or more uplink transmissions are associated with a physical uplink control channel, and wherein a second frequency hopping parameter of the first plurality of frequency hopping parameters associated with the first resource block set defines a second resource block of the first resource block set.

12. The apparatus of claim 4, wherein the one or more uplink transmissions are associated with a physical uplink shared channel, and wherein a second frequency hop parameter of the first plurality of frequency hopping parameters associated with the first resource block set defines an offset from the first frequency hopping parameter.

13. The apparatus of claim 1, wherein the instructions are further executable by the at least one processor, directly or after compilation, to cause the UE to:

select, for a second resource block set of the plurality of resource block sets, a second frequency hopping enablement status or a second frequency hopping pattern based at least in part on the full-duplex classification of the slot and a second plurality of frequency hopping parameters for the second resource block set.

14. The apparatus of claim 13, wherein the instructions to select the second frequency hopping enablement status are executable by the at least one processor, directly or after compilation, to cause the UE to:

disable frequency hopping for the second resource block set of the plurality of resource block sets based at least in part on the second plurality of frequency hopping parameters associated with the second resource block set, wherein at least one frequency hopping parameters of the second plurality of frequency hopping parameters for the second resource block set is associated with a frequency that is outside of a first sub-band in the slot and a second sub-band in the slot.

15. The apparatus of claim 1, wherein the instructions are further executable by the at least one processor, directly or after compilation, to cause the UE to:

receive control signaling indicating the different plurality of frequency hopping parameters associated with each resource block set of the plurality of resource block sets.

16. The apparatus of claim 1, wherein the slot is a sub-band full-duplex slot, and wherein the full-duplex classification is based at least in part on the sub-band full-duplex slot.

17. An apparatus for wireless communications at a network entity, comprising:

at least one processor; and one or more memories coupled to the at least one processor, the one or more memories storing instructions executable by the at least one processor, directly or after compilation, to cause the network entity to:

output an indication of a plurality of resource block sets over which a user equipment (UE) is to perform one or more uplink transmissions during a slot, wherein each resource block set of the plurality of resource block sets is associated with the slot and with a different plurality of frequency hopping parameters for performing frequency hopping within the slot, and wherein the slot is associated with a full-duplex classification; and obtain the one or more uplink transmissions during the slot over the plurality of resource block sets in accordance with a frequency hopping pattern.

18. The apparatus of claim 17, wherein the instructions are further executable by the at least one processor, directly or after compilation, to cause the network entity to:

output control signaling indicating a frequency hopping enablement status disabling frequency hopping based at least in part on the full-duplex classification of the slot, wherein disabling frequency hopping is based at least in part on the control signaling.

19. The apparatus of claim 17, wherein the instructions are further executable by the at least one processor, directly or after compilation, to cause the network entity to:

output control signaling indicating a respective plurality of frequency hopping parameters associated with each resource block set of the plurality of resource block sets.

20. The apparatus of claim 19, wherein the one or more uplink transmissions are associated with a physical uplink control channel, and where the respective plurality of frequency hopping parameters associated with each resource block set of the plurality of resource block sets comprises a respective first frequency hop parameter associated with a first resource block of a respective resource block set and a respective second frequency hop parameter associated with a second resource block of the respective resource block set.

21. The apparatus of claim 19, wherein the one or more uplink transmissions are associated with a physical uplink shared channel, and where the respective plurality of frequency hopping parameters associated with each resource block set of the plurality of resource block sets comprises a respective first frequency hop parameter associated with a first resource block of a respective resource block set and a respective second frequency hop parameter associated with an offset from the first resource block.

22. The apparatus of claim 17, wherein the slot is a sub-band full-duplex slot, and wherein the full-duplex classification is based at least in part on the sub-band full-duplex slot.

23. A method for wireless communications at a user equipment (UE), comprising:

receiving an indication of a plurality of resource block sets over which the UE is to perform one or more uplink transmissions during a slot associated with a full-duplex classification, wherein each resource block set of the plurality of resource block sets is associated with the slot and with a different plurality of frequency hopping parameters for performing frequency hopping within the slot;

selecting, for a first resource block set of the plurality of resource block sets, a frequency hopping enablement status or a frequency hopping pattern based at least in part on the full-duplex classification of the slot and a first plurality of frequency hopping parameters associated with the first resource block set; and performing the one or more uplink transmissions during the slot over the plurality of resource block sets in accordance with the selected frequency hopping enablement status or the selected frequency hopping pattern.

24. The method of claim 23, wherein selecting the frequency hopping enablement status comprises:

disabling frequency hopping for the first resource block set based at least in part on the full-duplex classification of the slot.

25. The method of claim 23, wherein selecting the frequency hopping pattern comprises:

selecting a first frequency hopping pattern associated with a first sub-band in the slot based at least in part on the full-duplex classification of the slot, wherein the first sub-band is based at least in part on a first resource block of the first resource block set within the slot, wherein a first frequency hopping parameter of the first plurality of frequency hopping parameters associated with the first resource block set defines the first resource block.

26. The method of claim 25, wherein performing the one or more uplink transmissions during the slot the plurality of resource block sets in accordance with the selected frequency hopping pattern comprises:

hopping from the first resource block of the first resource block set to a second resource block of the first resource block set within the slot, wherein the second resource block is selected based at least in part on a second frequency hopping parameter of the first plurality of frequency hopping parameters associated with the first resource block set, and the second resource block is specific to the first sub-band.

27. The method of claim 25, wherein performing the one or more uplink transmissions during the slot over the plurality of resource block sets in accordance with the selected frequency hopping pattern comprises:

hopping from the first resource block of the first resource block set to a second resource block of the first resource block set within the slot, based at least in part on a second frequency hopping parameter of the first plurality of frequency hopping parameters associated with the first resource block set, the first frequency hopping parameter of the first plurality of frequency hopping parameters associated with the first resource block set, and a quantity of resource blocks in the first sub-band.

28. The method of claim 23, further comprising:

selecting, for a second resource block set of the plurality of resource block sets, a second frequency hopping enablement status or a second frequency hopping pattern based at least in part on the full-duplex classification of the slot and a second plurality of frequency hopping parameters for the second resource block set.

29. The method of claim 28, wherein selecting the second frequency hopping enablement status comprises:

disabling frequency hopping for the second resource block set of the plurality of resource block sets based at least in part on the second plurality of frequency hopping parameters associated with the second resource block set, wherein at least one frequency hopping parameters of the second plurality of frequency hopping parameters for the second resource block set is associated with a frequency that is outside of a first sub-band in the slot and a second sub-band in the slot.

30. A method for wireless communications at a network entity, comprising:

outputting an indication of a plurality of resource block sets over which a user equipment (UE) is to perform one or more uplink transmissions during a slot, wherein each resource block set of the plurality of resource block sets is associated with the slot and with a different plurality of frequency hopping parameters for performing frequency hopping within the slot, and wherein the slot is associated with a full-duplex classification; and obtaining the one or more uplink transmissions during the slot over the plurality of resource block sets in accordance with a frequency hopping pattern.

* * * * *